United States Patent [19]

Izawa et al.

[11] Patent Number: 5,179,658

[45] Date of Patent: Jan. 12, 1993

[54] INFORMATION PROCESSING APPARATUS

[75] Inventors: Koji Izawa; Shiro Takagi, both of Yokohama; Tadanobu Kamiyama, Yokosuka, all of Japan

[73] Assignee: Kabushiki Kaisha Toshiba, Kawasaki, Japan

[21] Appl. No.: 784,662

[22] Filed: Oct. 24, 1991

Related U.S. Application Data

[63] Continuation of Ser. No. 243,732, Sep. 13, 1988, abandoned.

[30] Foreign Application Priority Data

Sep. 14, 1987 [JP] Japan ............................ 62-230020

[51] Int. Cl.$^5$ ............................................. G06F 15/62
[52] U.S. Cl. .............................. 395/164; 364/DIG. 2; 364/920.7; 364/927.2
[58] Field of Search ............... 395/275, 164; 340/723, 340/789, 798

[56] References Cited

U.S. PATENT DOCUMENTS

| 4,075,695 | 2/1978 | Lelke | 364/200 |
|---|---|---|---|
| 4,604,653 | 8/1986 | Shimizu | 364/200 |
| 4,604,686 | 8/1986 | Reiter et al. | 364/200 |
| 4,631,664 | 12/1986 | Bachman | 364/200 |
| 4,885,704 | 12/1989 | Takagi et al. | 340/710 |
| 4,964,039 | 10/1990 | Izawa et al. | 395/500 |

OTHER PUBLICATIONS

Chauvin et al., "A Document Storage Application: The Sarde Project", Proceedings of SPIE—The International Society for Optical Engineering, vol. 490, pp. 39–42, Jun. 1984.

Gibbs et al., "Muse: A Multimedia Filing System", IEEE Software, vol. 4, No. 2, pp. 4–14, Mar. 1987.

Horak et al., "Layering Approach Manages Mixed Documents", Electronic Design, pp. 49–54, Apr. 15, 1982.

Primary Examiner—Michael R. Fleming
Assistant Examiner—Debra A. Chun
Attorney, Agent, or Firm—Finnegan, Henderson, Farabow, Garrett and Dunner

[57] ABSTRACT

An information processing apparatus having a scanner and a magnetic disk, both for supplying data to be stored, and an optical disk for storing the supplied data. The scanner supplies image data. The magnetic disk supplies code data such as document data and drawing data. The processing apparatus stores the image data and the code data into the optical disk, each type of data having a flag indicating its type.

8 Claims, 29 Drawing Sheets

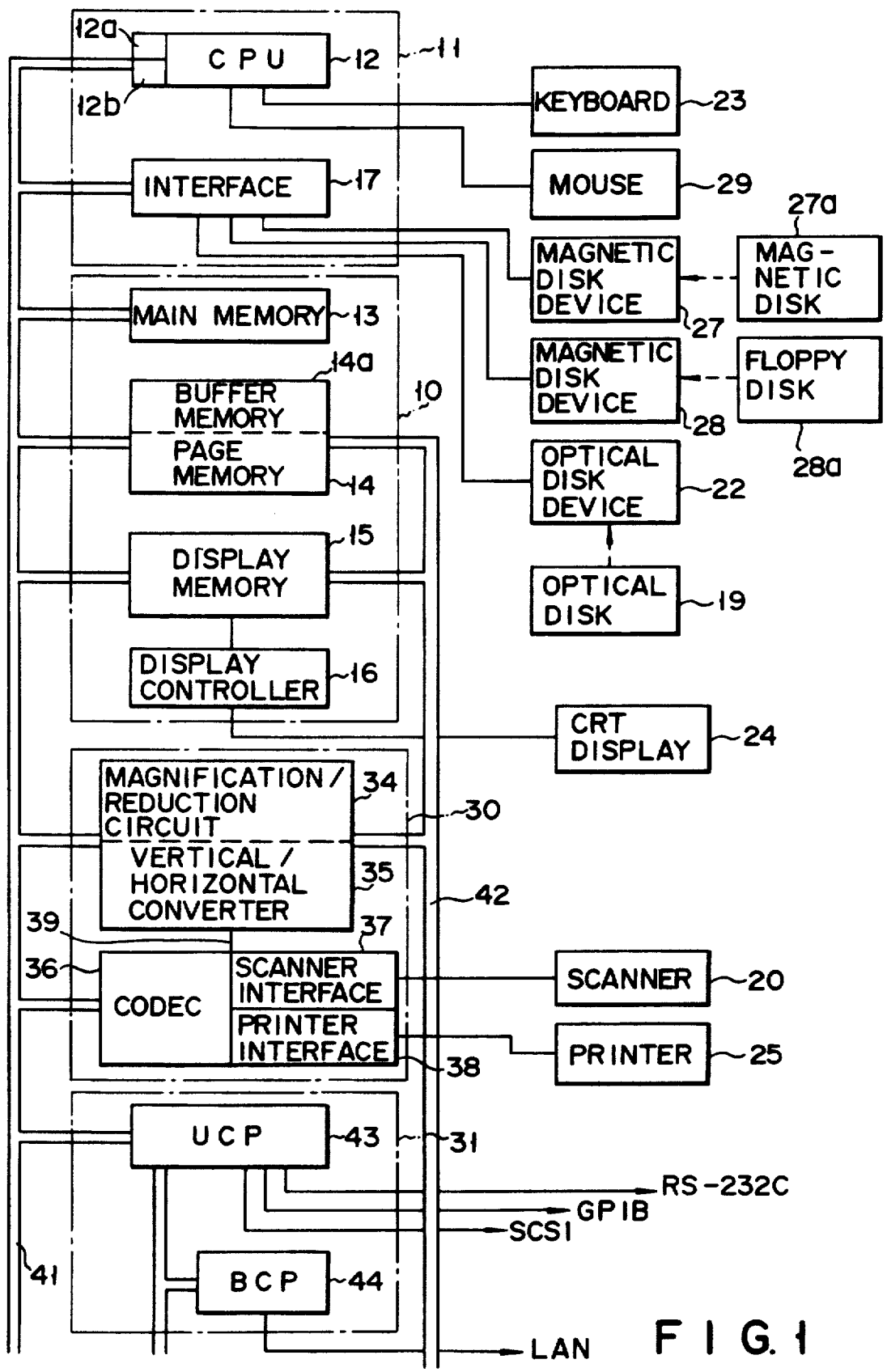
F I G. 1

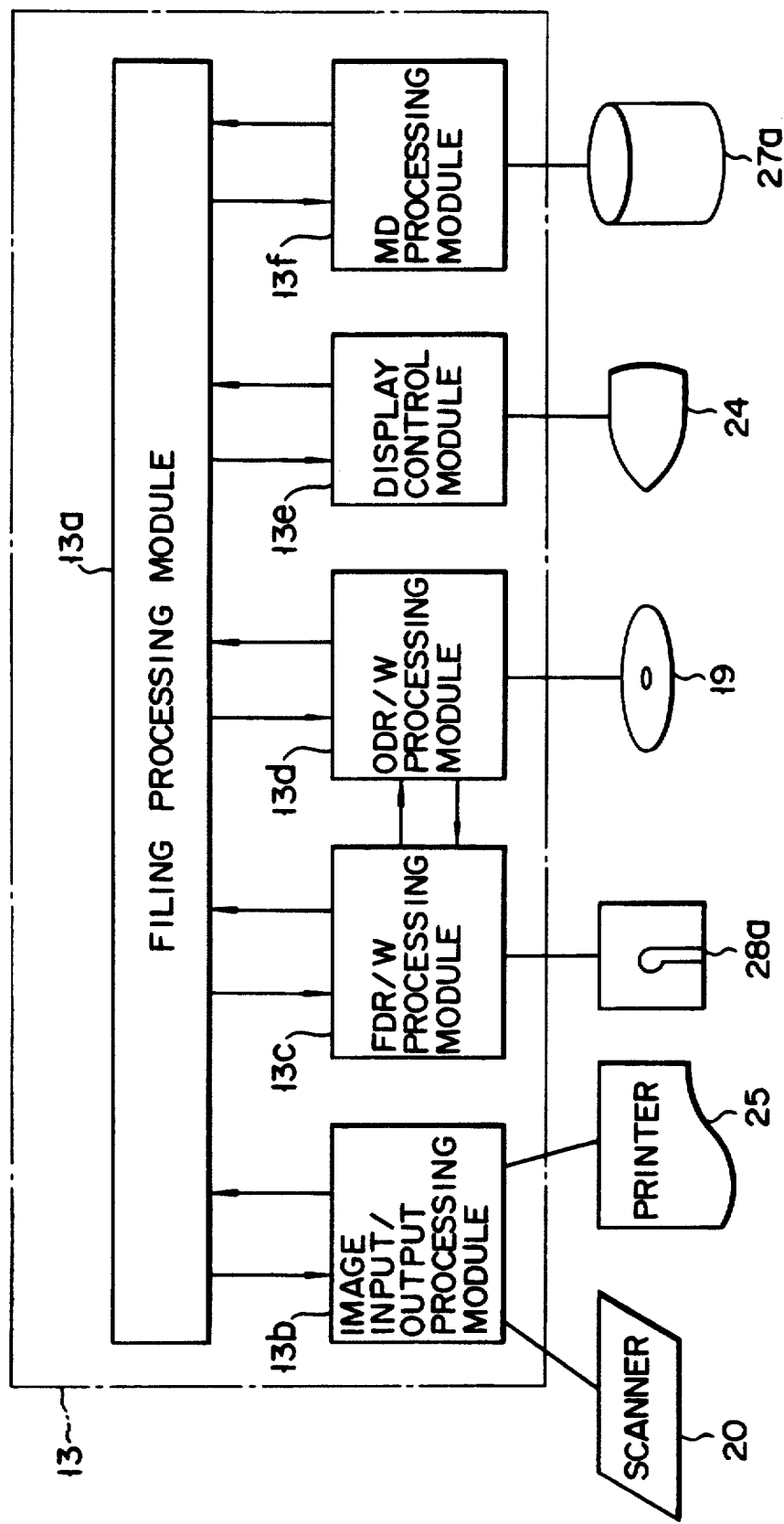
F I G. 3

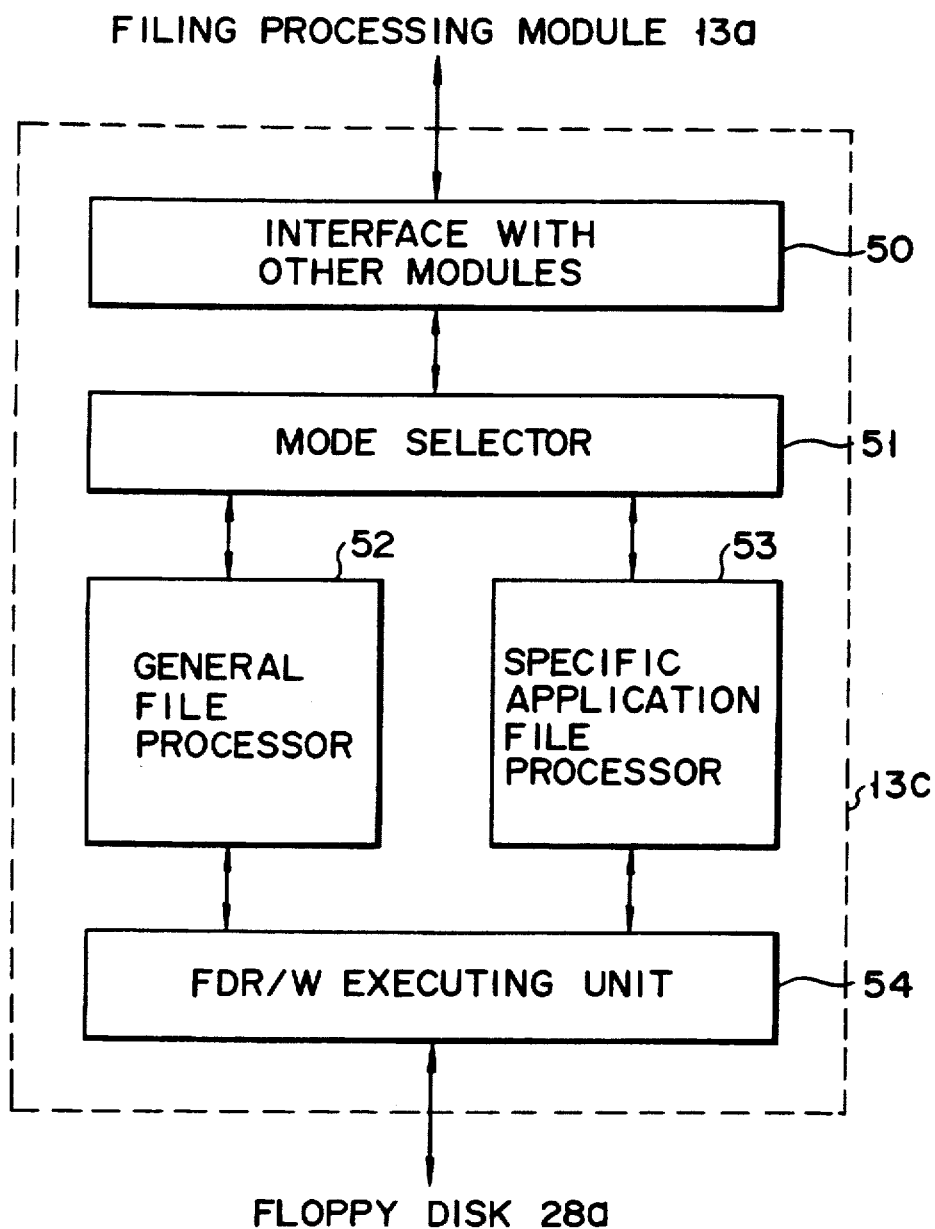
F I G. 4

F I G. 7

| SUB-HEADER LENGTH (2 BYTES) | KIND FLAG (2 BYTES) | DATA ADDRESS (4 BYTES) | DATA SIZE (4 BYTES) | COM-PRESSION FORM (2 BYTES) | SCANN-ING DENSITY (2 BYTES) | IMAGE SIZE (4 BYTES) | OPTION AREA (0~n BYTES) |

F I G. 8

| SUB-HEADER LENGTH (2 BYTES) | KIND FLAG (2 BYTES) | DATA ADDRESS (4 BYTES) | DATA SIZE (4 BYTES) | DEVICE FLAG (2 BYTES) | DENSI-TY FLAG (2 BYTES) | OS FLAG (2 BYTES) | VOLUME NAME (12 BYTES) | OPTION AREA (0~n BYTES) |

F I G. 9

| SUB-HEADER LENGTH (2 BYTES) | KIND FLAG (2 BYTES) | DATA ADDRESS (4 BYTES) | DATA SIZE (4 BYTES) | DEVICE FLAG (2 BYTES) | DENSI-TY FLAG (2 BYTES) | OS FLAG (2 BYTES) | VOLUME NAME (12 BYTES) | DIRECTORY ENTRY DATA (32 BYTES) | OPTION AREA (0~n BYTES) |

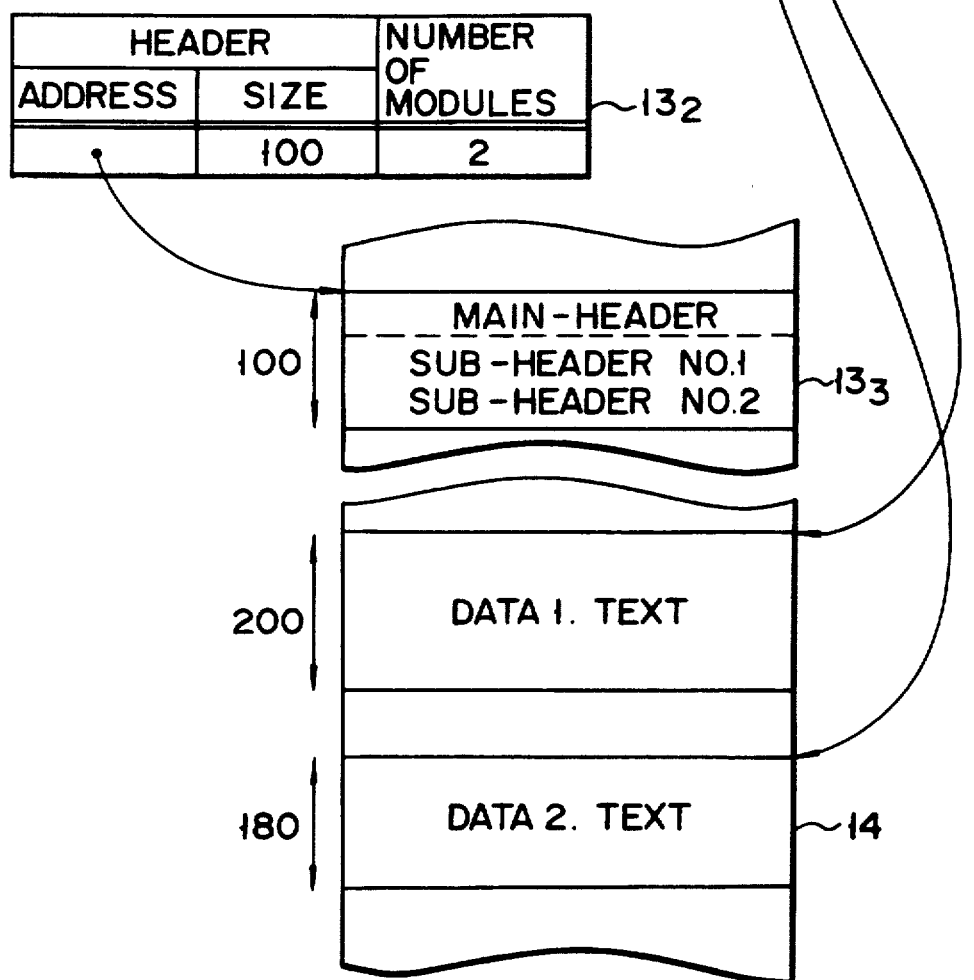
F I G. 10

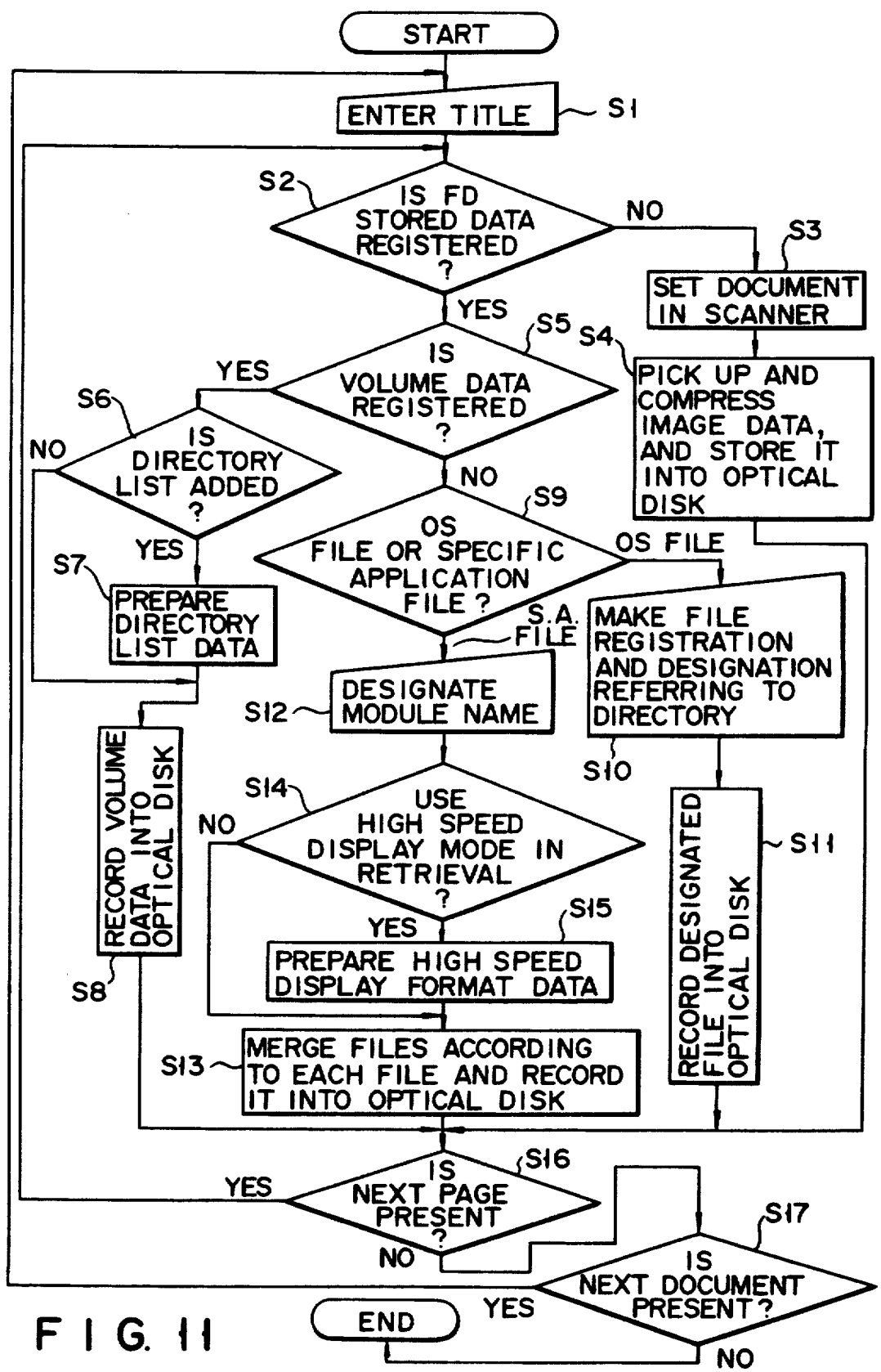
F I G. 11

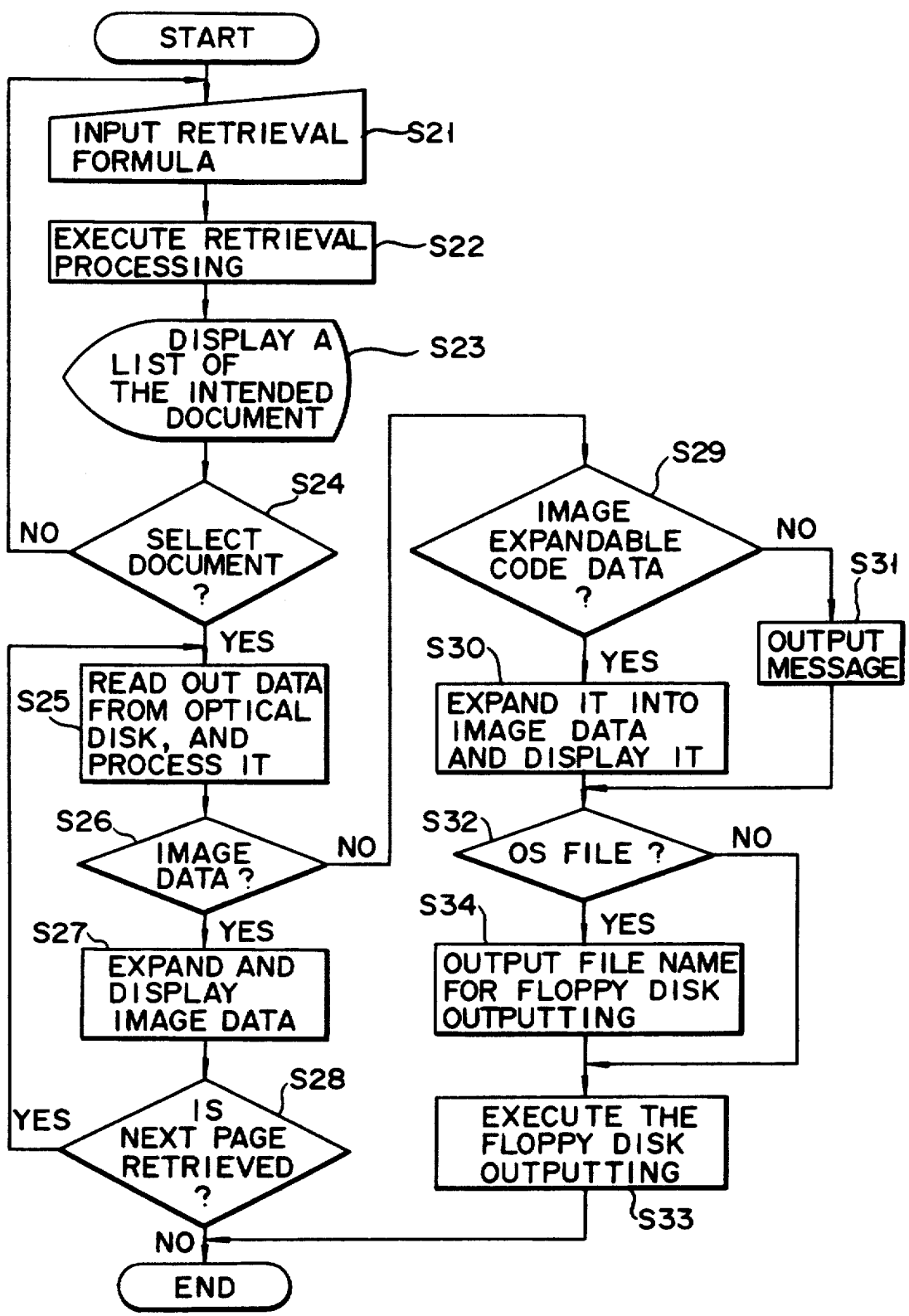
F I G. 12

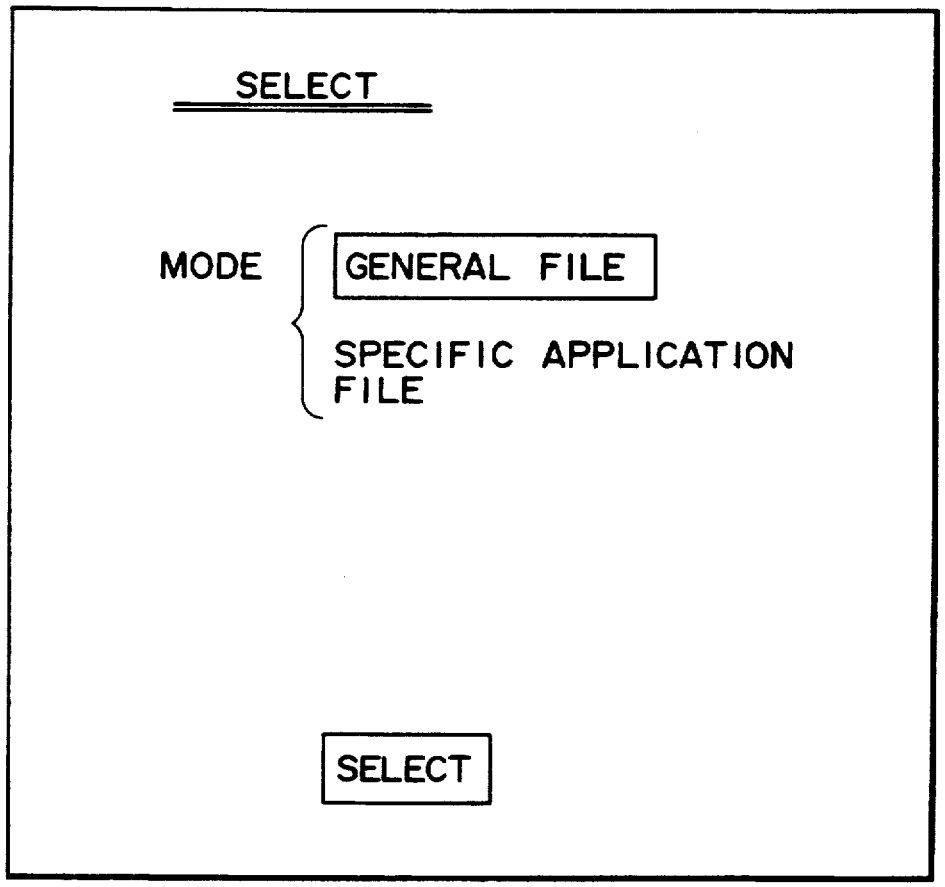
F I G. 13

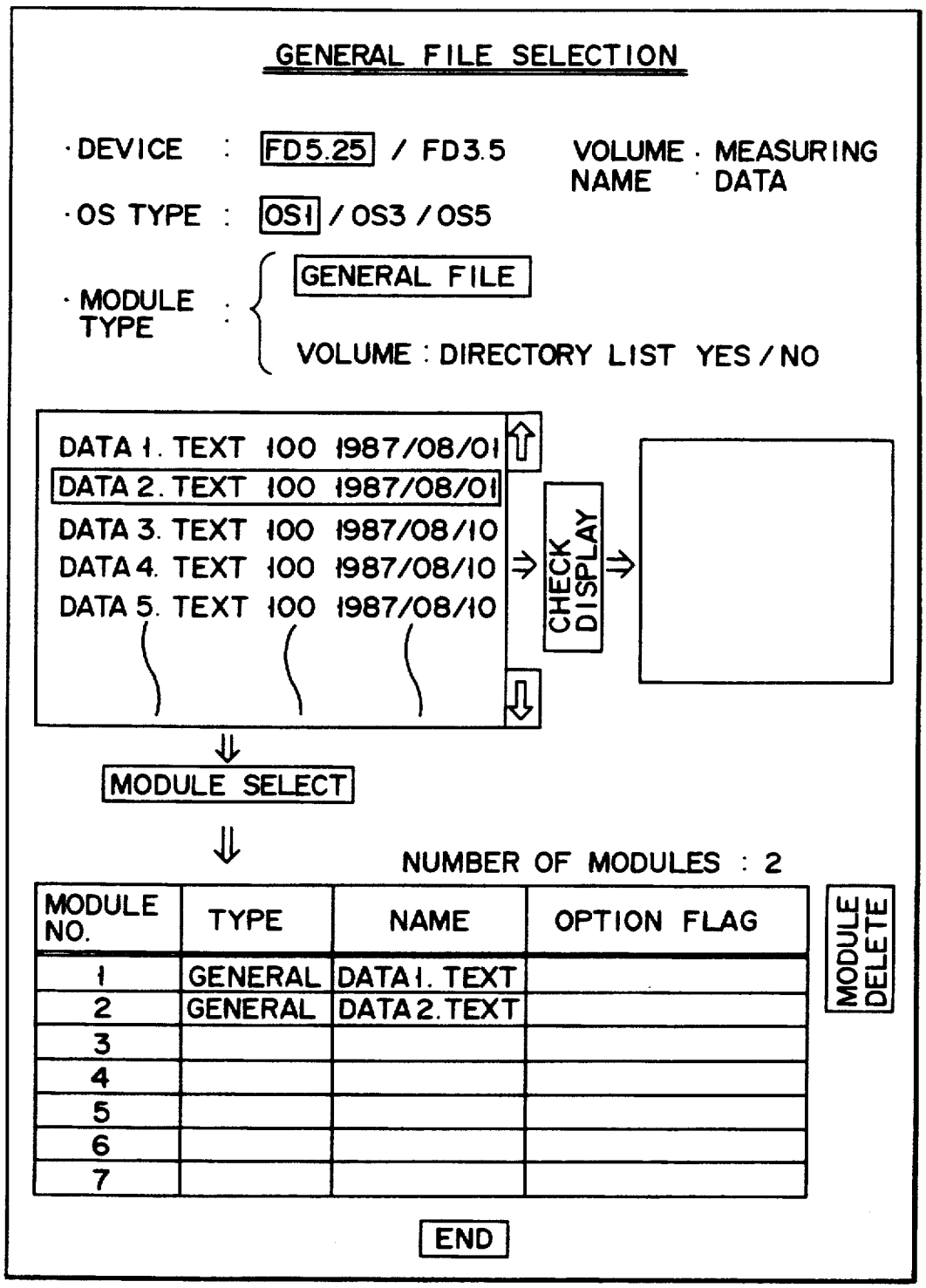
F I G. 14

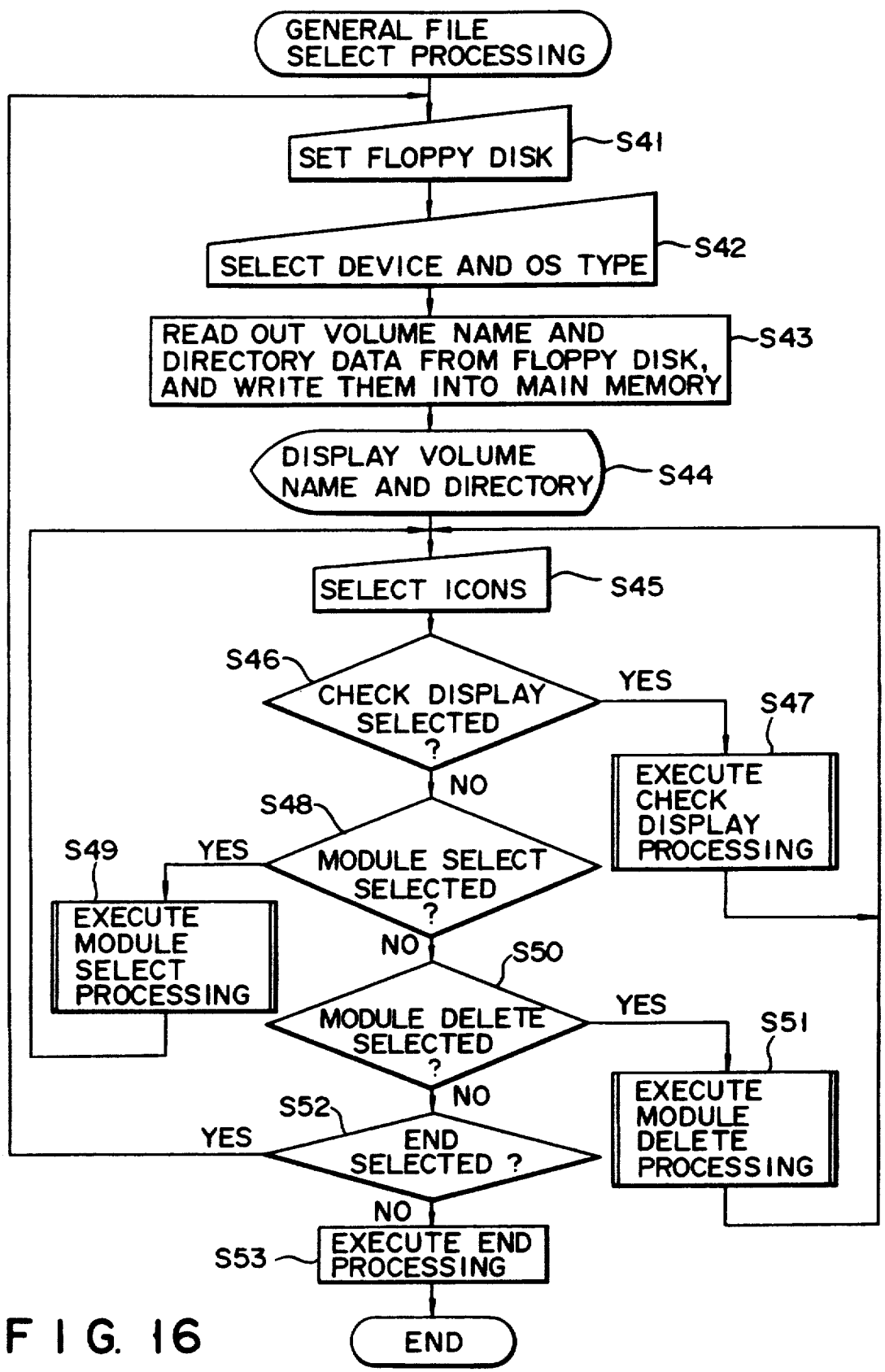
F I G. 16

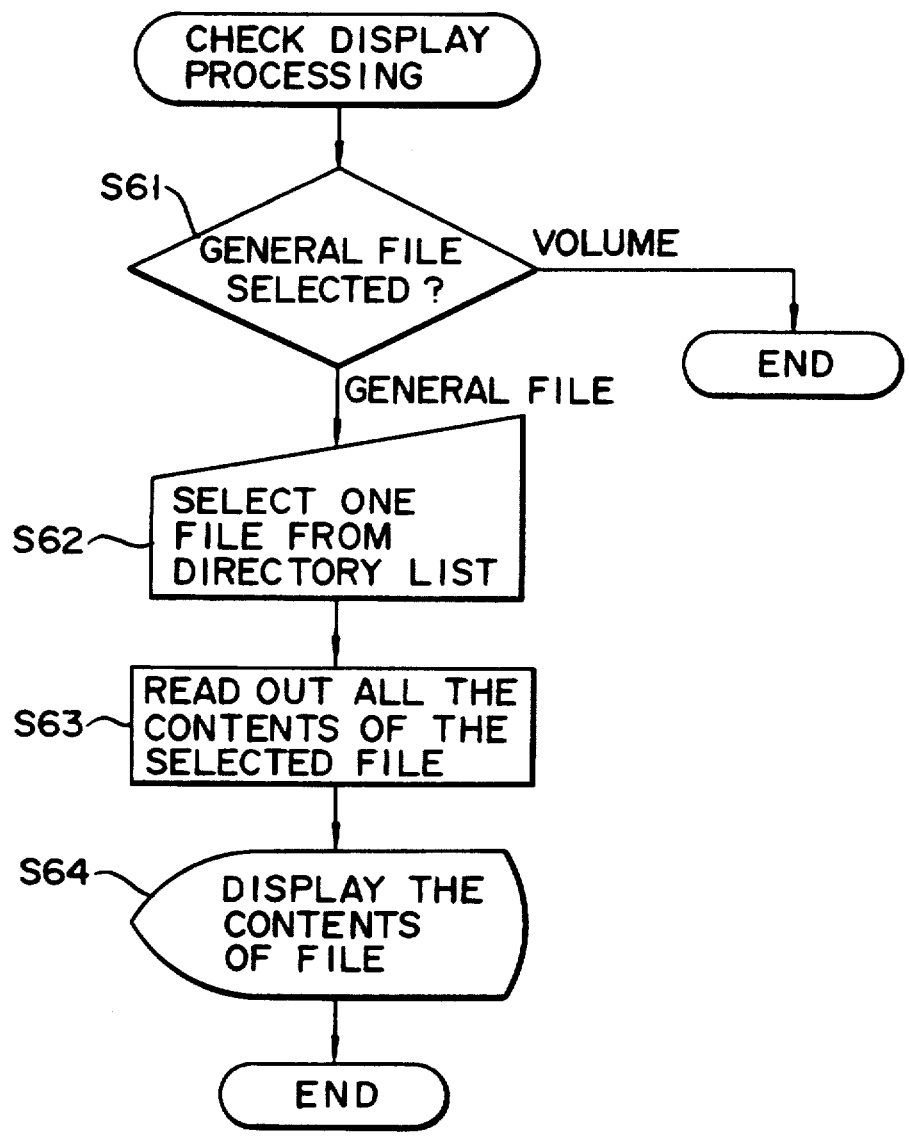
F I G. 17

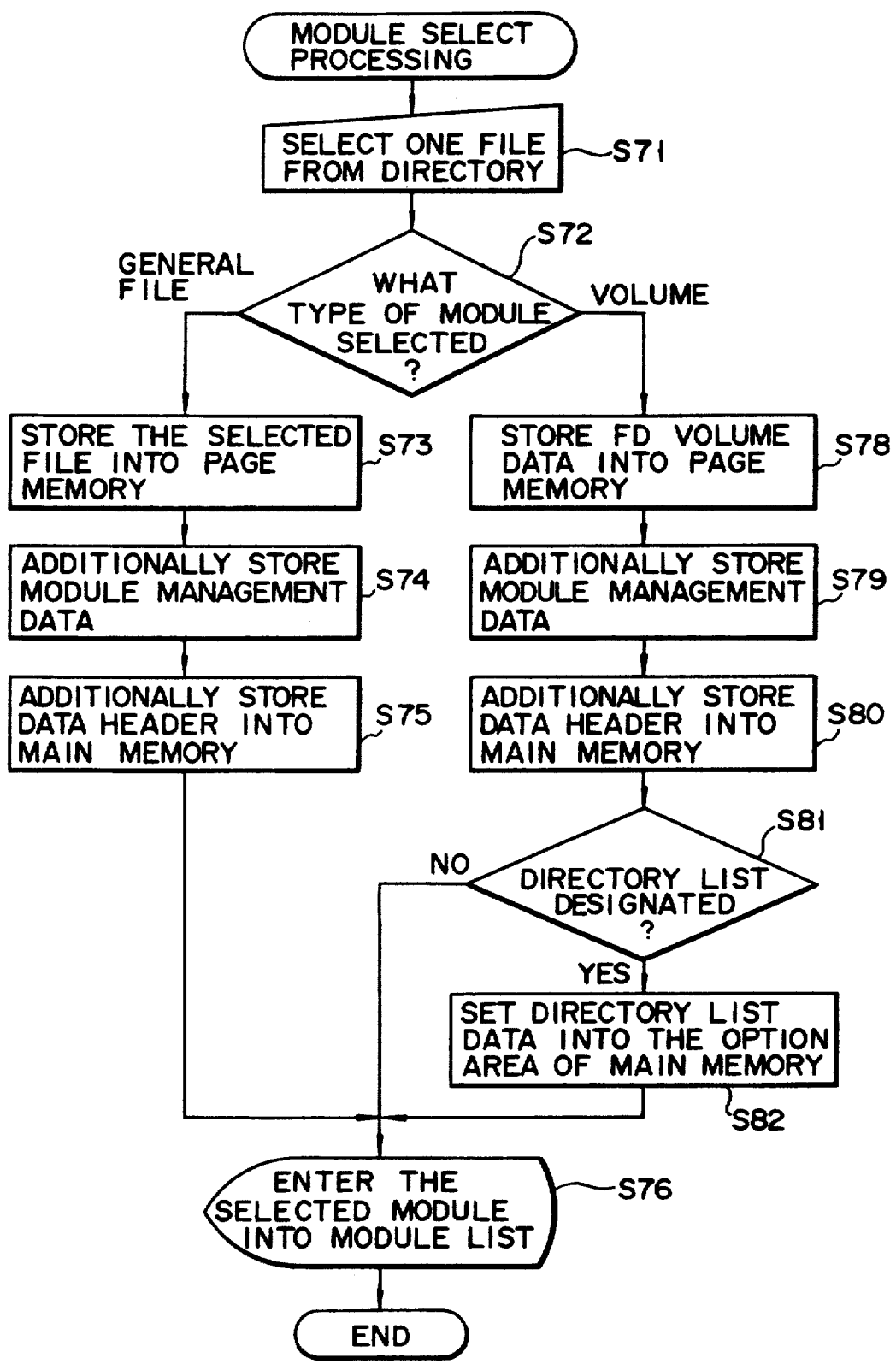
F I G. 18

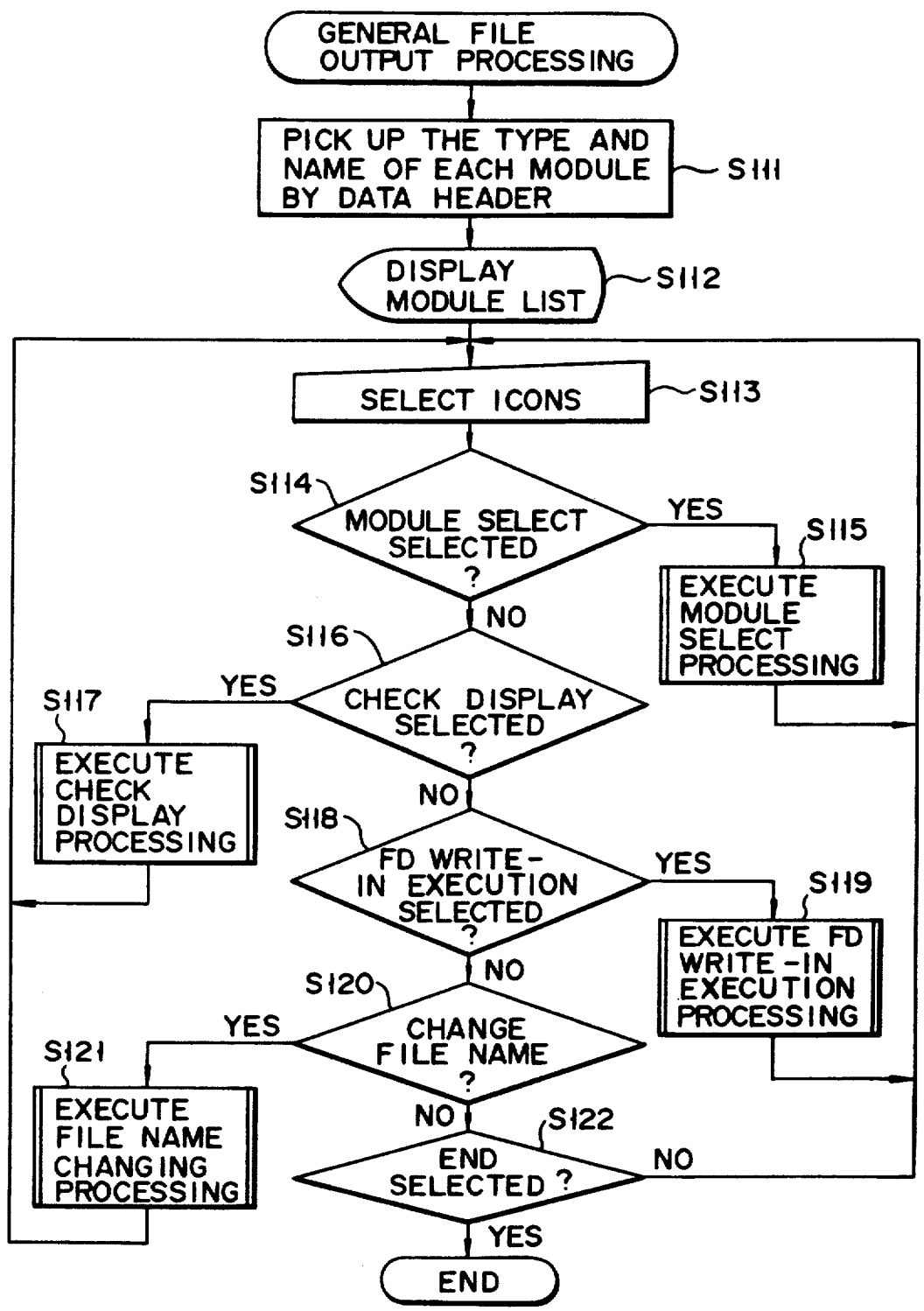
F I G. 21

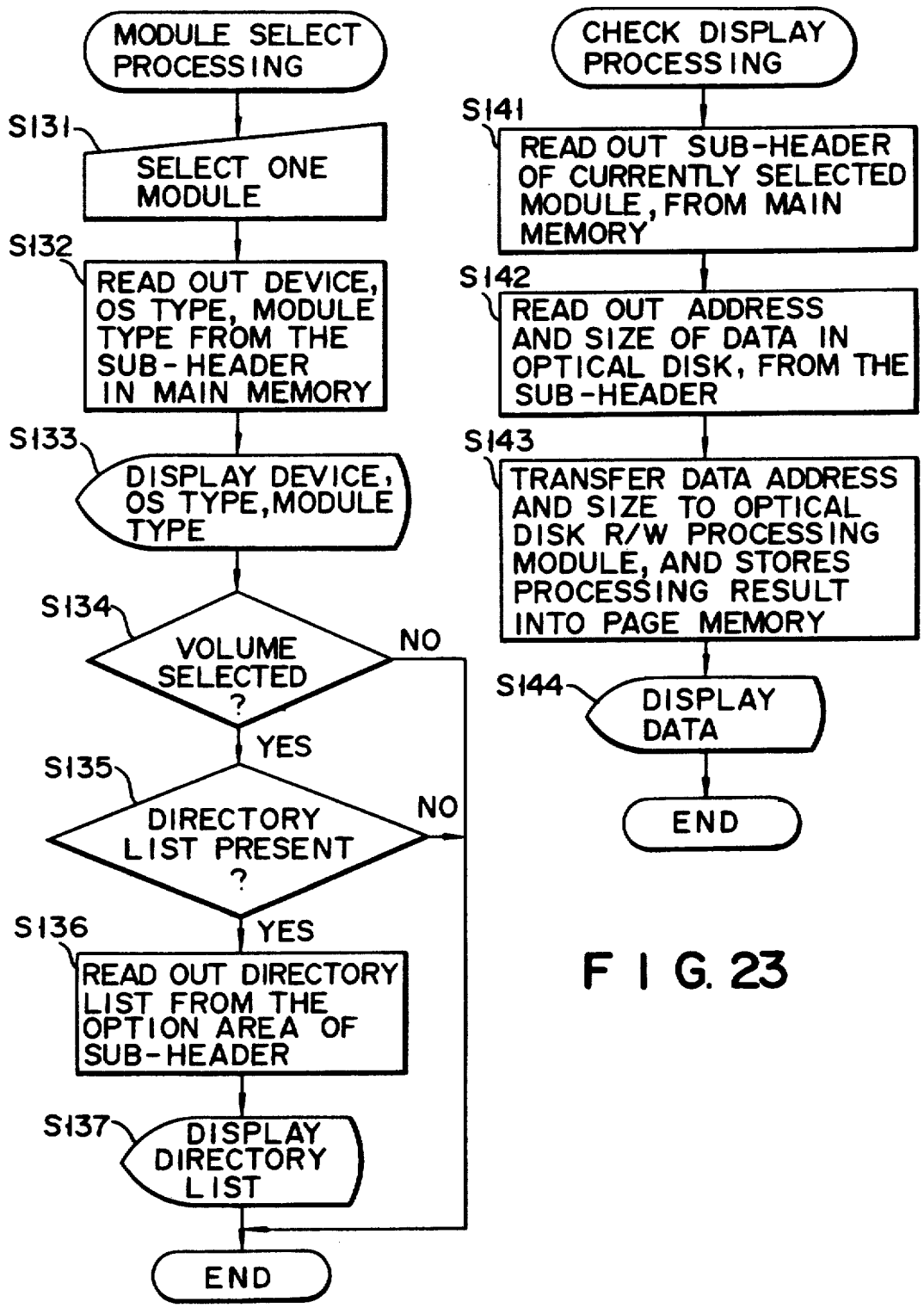

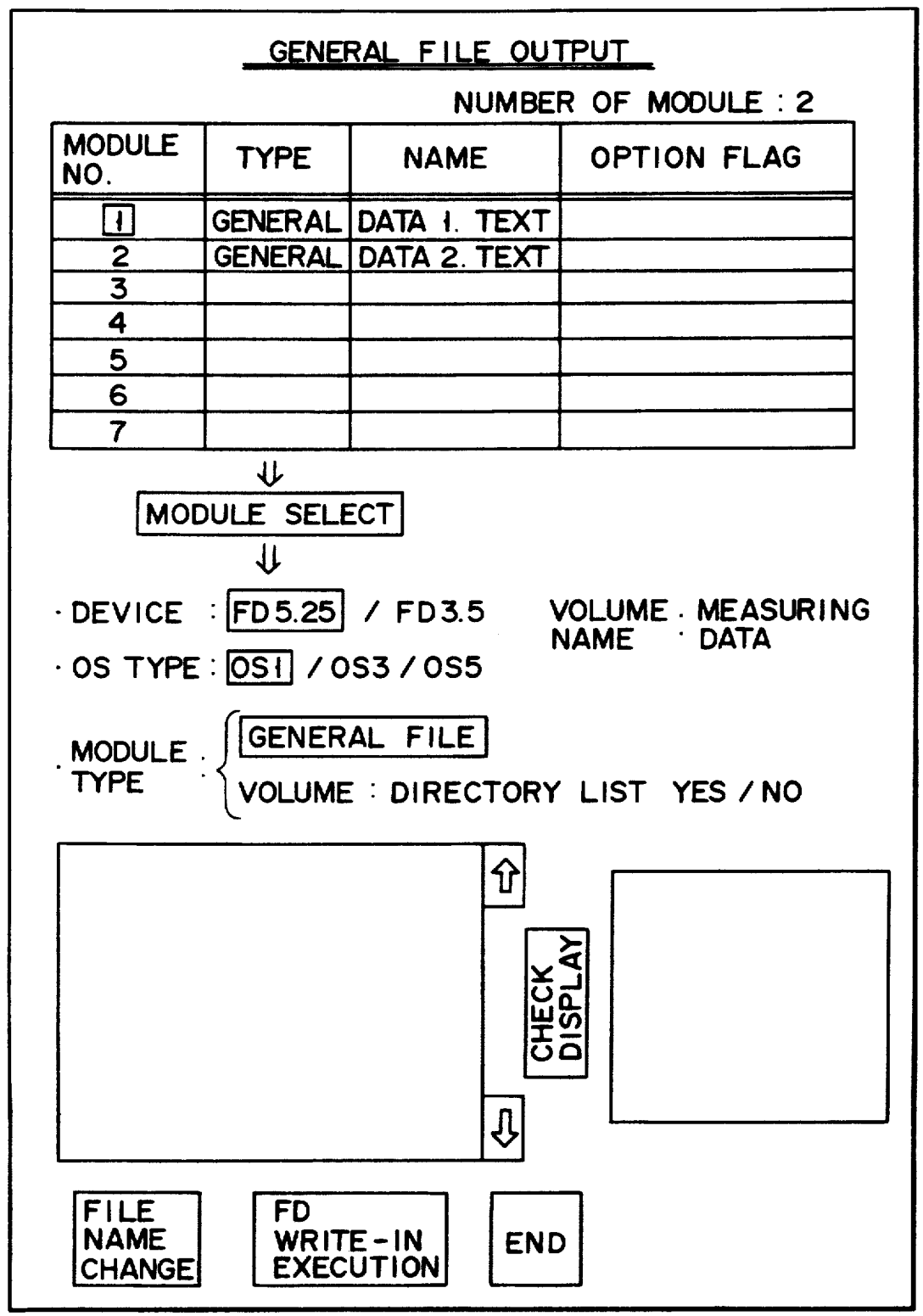
F I G. 25

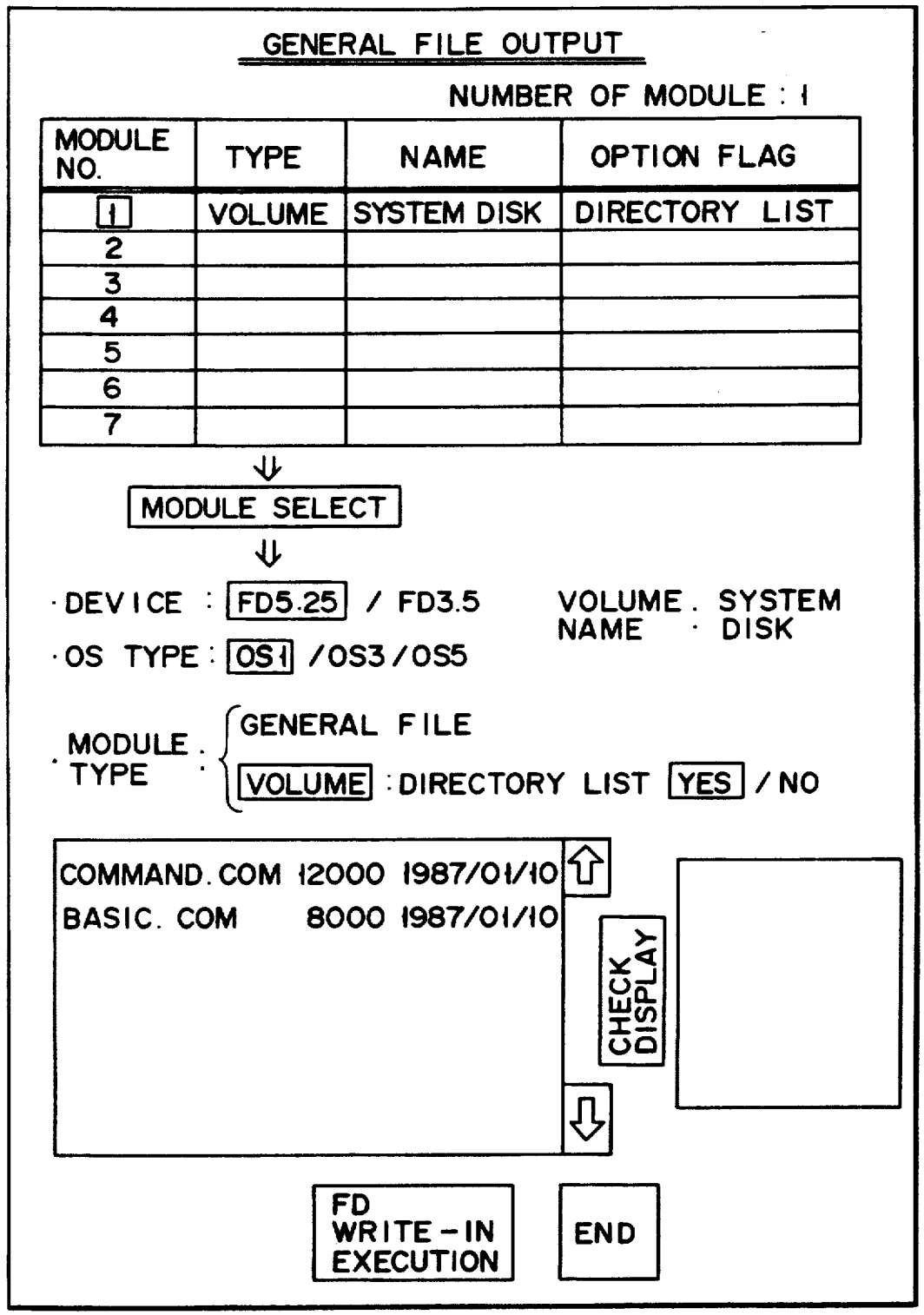
F I G. 26

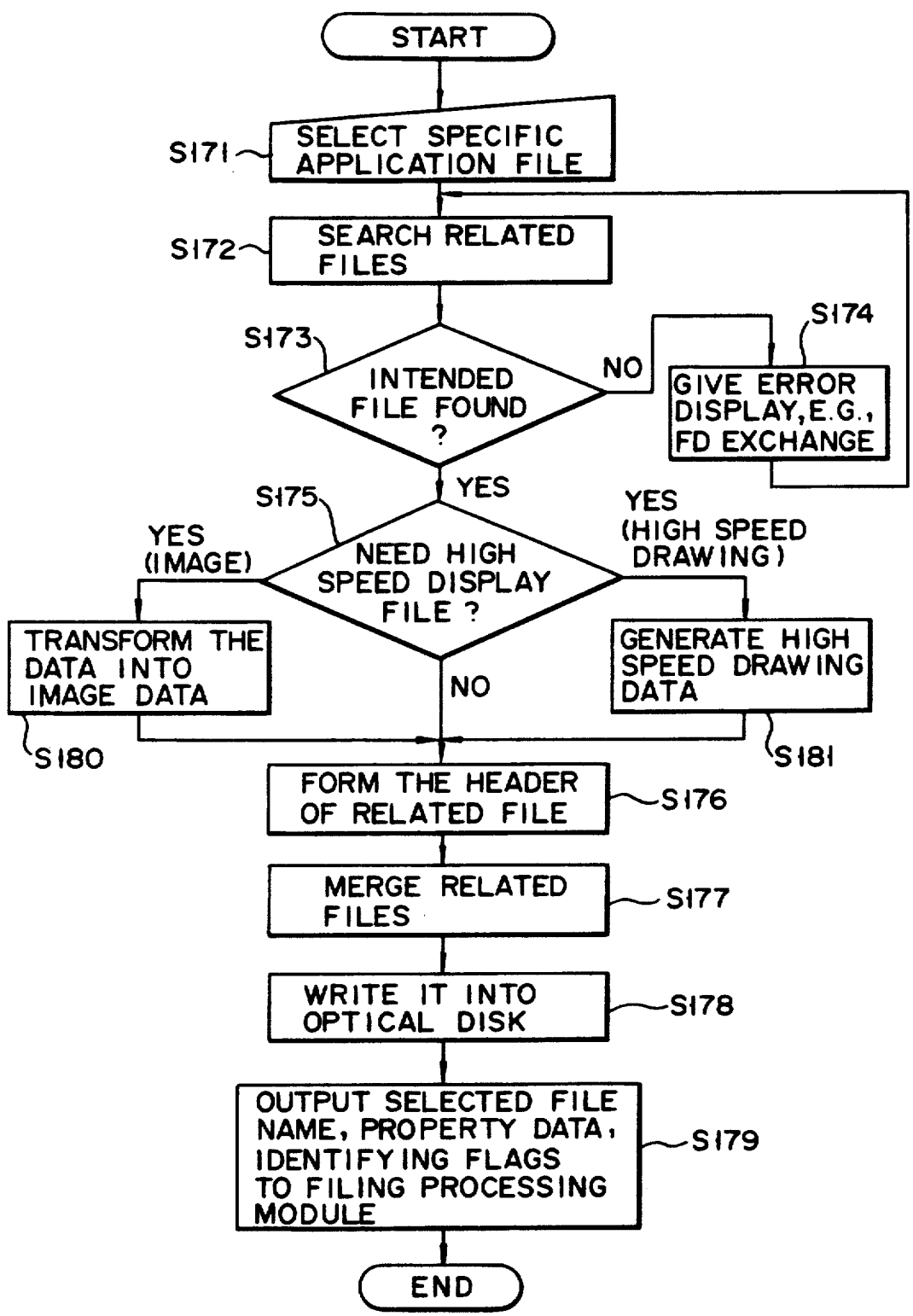
F I G. 27

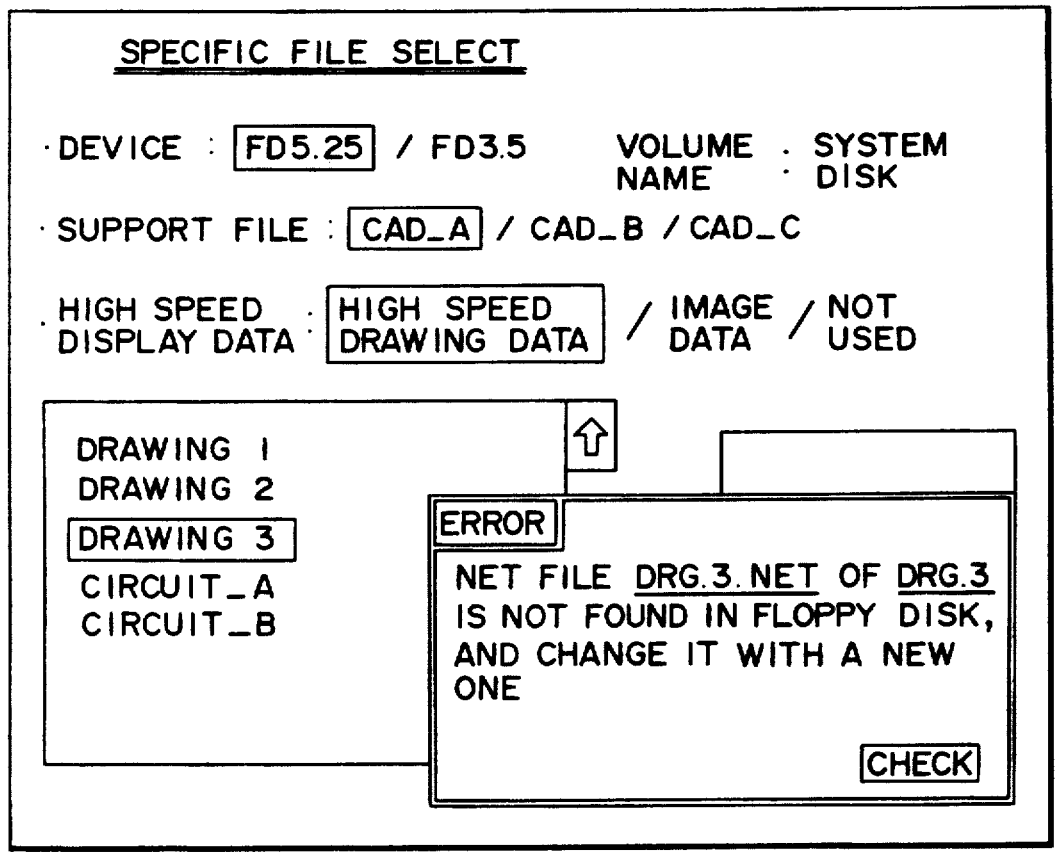
F I G. 29

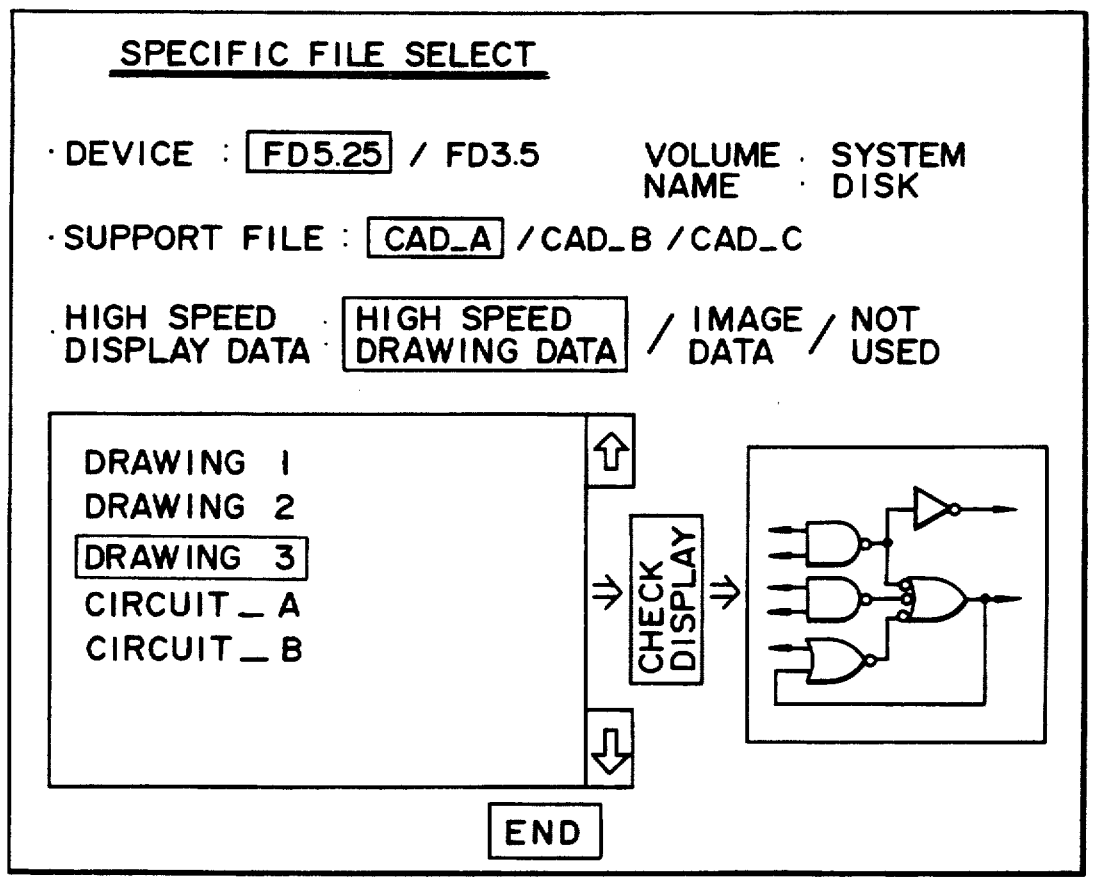
F I G. 30

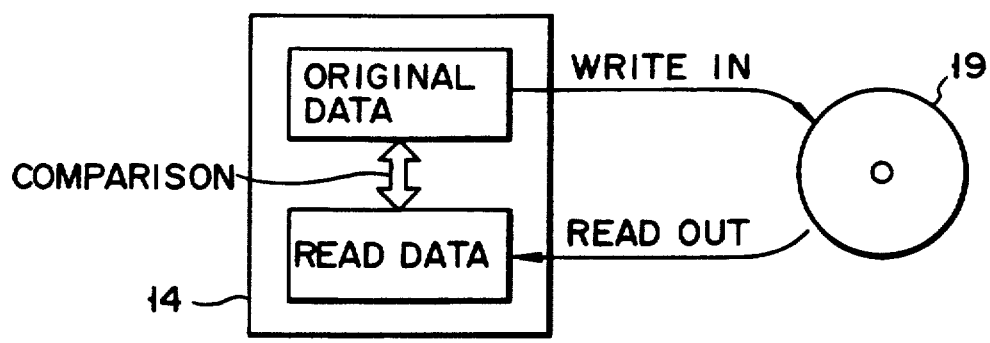
F I G. 31
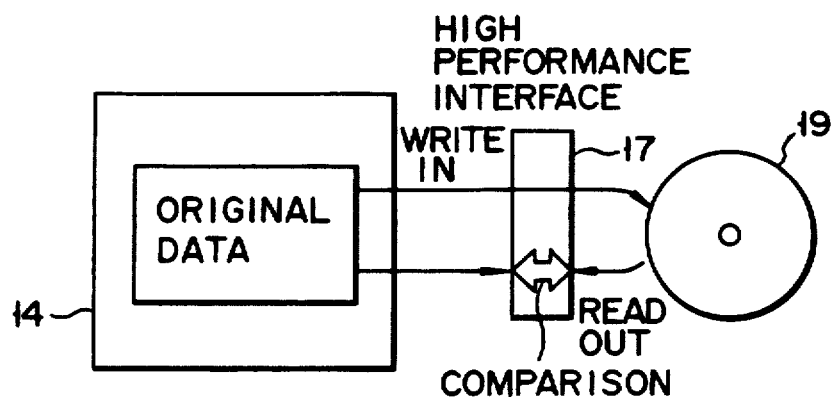
F I G. 32
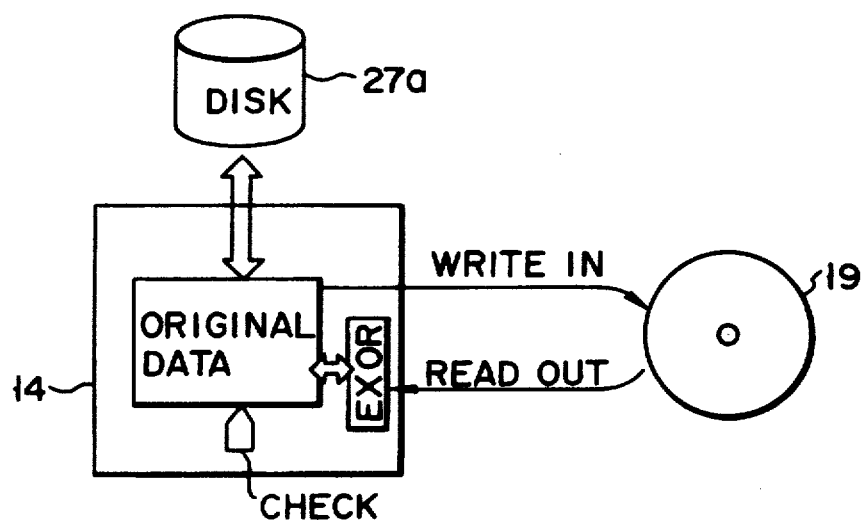
F I G. 33

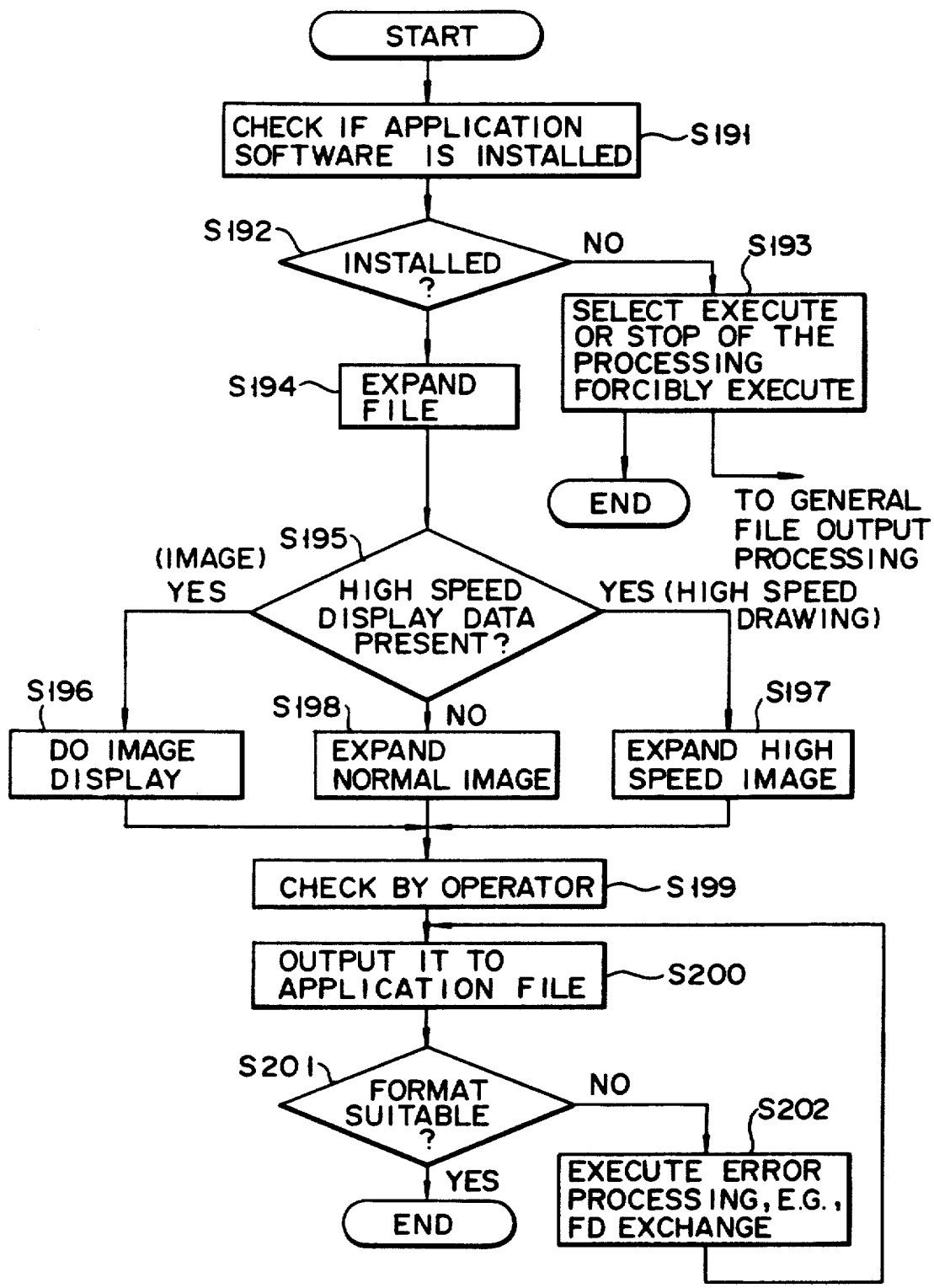
F I G. 34

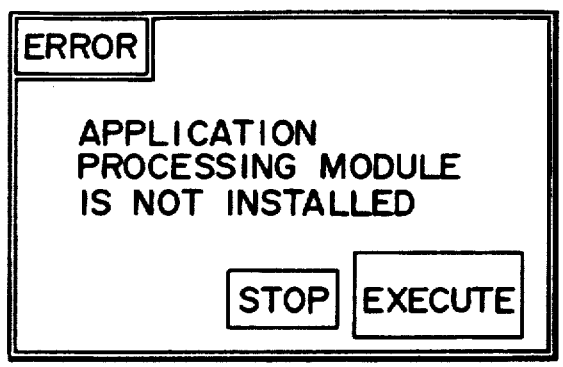
F I G. 35
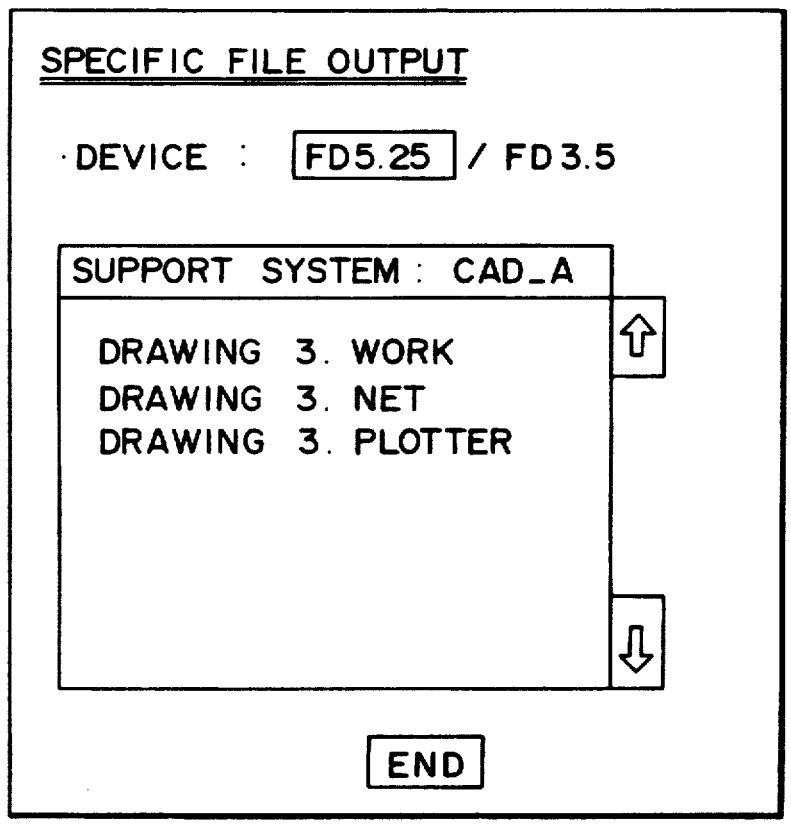
F I G. 36
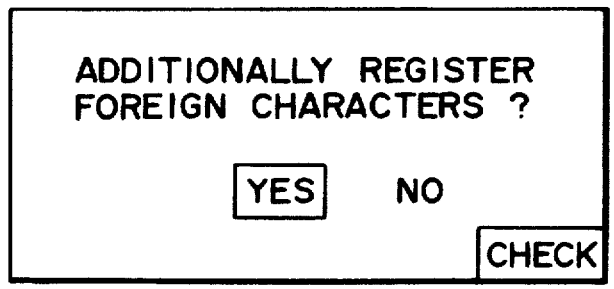
F I G. 37

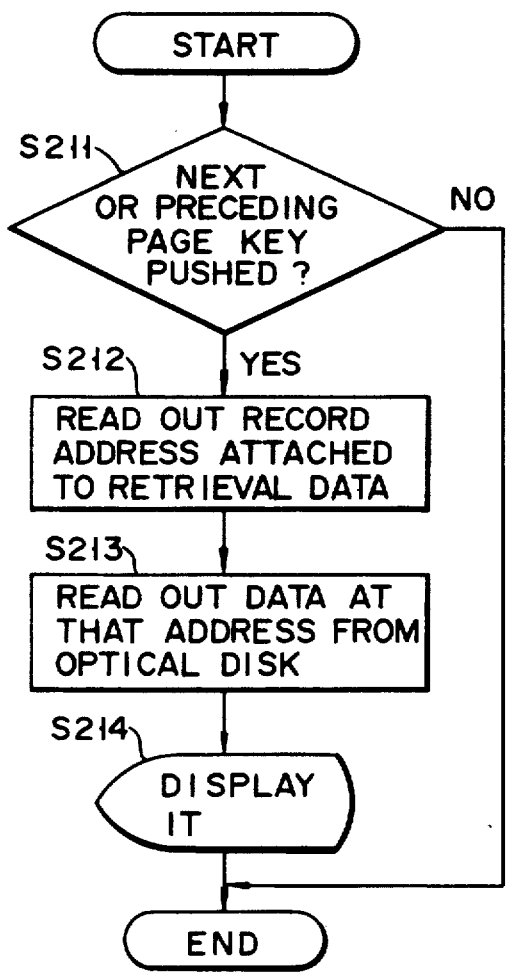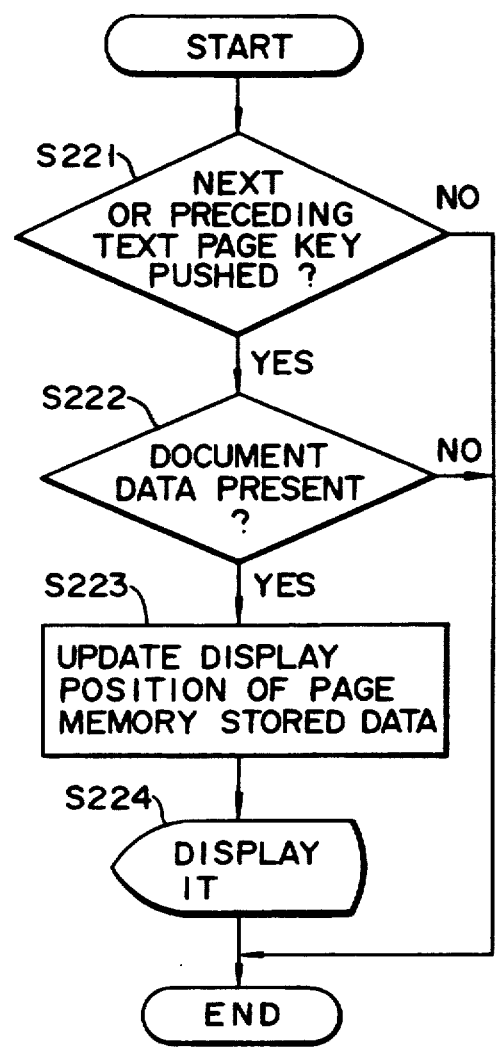
F I G. 38                F I G. 39

INFORMATION PROCESSING APPARATUS

This application is a continuation of application Ser. No. 07/243,732, filed Sep. 13, 1988, now abandoned.

BACKGROUND OF THE INVENTION

1. Field of the Invention

The present invention related to an information processing apparatus for electronically filing documents in connection with a recording medium of large memory capacity.

2. Description of the Related Art

Recently, offices and manufacturing factories have been flooded with a tremendous number of documents containing literal and graphic information. This causes a need for effective filing and retrieval apparatus. The recent documents may come in three varieties: normal literal documents and drawings that are manually written or that are drawn and printed in a conventional manner, documents having character code data, as processed by word processors, and drawings (having vector data) as prepared by personal computers and CAD (computer aided design) systems. The word processed data, and the graphic and pictorial data as generated with the aid of personal computers and CAD systems, are magnetically stored onto floppy disks. Generally, the hard copy of these types of information, together with the floppy disks, are filed for preservation and reference. The hard copy is space consuming.

U.S. Pat. No. 4,604,653 by Shimizu, issued on Aug. 5, 1986 discloses a document filing apparatus. The filing apparatus optically and two-dimensionally scans documents by way of a two-dimensional scanner, to pick up the information on the documents, and stores the data as image data onto an optical disk or disks. When certain data is needed later, the intended data is quickly retrieved from the optical disk.

The filing apparatus of Shimizu can handle only the image data as read in by the scanner. In other words, a document management system employed by the filing apparatus is unable to handle both the floppy disk (FD) stored data and the optical disk stored data, because of format difference thereof. To store the FD data into an optical disk, therefore, a user must perform two additional bothersome steps: printing out the FD data into a hard copy, and reading in the hard copied data with the scanner. Such steps are time consuming, and may irritate users. Such steps may even make the user avoid operating the filing apparatus.

Another information processing apparatus for document filing apparatus exists and is capable of reading out the the data from a floppy disk and storing it into the optical disk. In the processing apparatus, however, the management system for the image data cannot handle the floppy disk stored data. Therefore, when the document data and the drawing data being stored in a floppy disk are read out therefrom and stored into an optical disk, it is a common practice to drive different systems. In most case, different apparatuses have been used for the storage of such type of data into the optical disk. Such storage operations by different systems or apparatuses are bothersome and intricate particularly for unskilled operators, and hence hinder a smooth filing operation. Furthermore, the necessity of using the different systems makes it impossible to both manage and preserve those documents including drawings.

For the above reasons, an information processing apparatus capable of handling and managing both types of the data, the floppy disk stored data and the optical disk stored data is needed.

SUMMARY OF THE INVENTION

Accordingly, an object of this invention is to provide an information processing apparatus in which the FD stored data of document and drawing are handled, e.g., like paper document and drawings, and in which both types of data are synthetically managed.

According to one aspect of this invention, there is provided an information processing apparatus for processing both image data and code data, the apparatus comprising first storing means for storing at least one of the image data and the code data, and second storing means for storing first retrieval data for retrieving the image data from the first storing means and second retrieval data for retrieving the code data from the first storing means, the first retrieval data having a data structure for defining the retrieval data and first identifying data representing the image data, the second retrieval data having the same data structure as the data structure of the first retrieval data and second identifying data representing the code data.

According to another aspect of this invention, there is provided an information processing apparatus comprising first input means for inputting image data, second input means for inputting code data, means for storing at least one of the image data input by the first input means and the code data input by the second input means, means for preparing flag data indicating the image and code data input by one of the first and second input means, and control means for making such a control as to store into the storing means either of the image data and the code data input by the first input means and the second input means, attendant with the flag data prepared by the preparing means, the same data structure being applied to both the image data and the code data.

According to still another aspect of this invention, there is provided an information processing apparatus for processing both image data and code data, the apparatus comprising first storing means for storing at least one of the image data and the code data, second storing means for storing first retrieval data for retrieving the image data from the first storing means and second retrieval data for retrieving the code data from the first storing means, the first retrieval data having data structure for defining the retrieval data and the second retrieval data having the same data structure as the data structure of the first retrieval data, means for inputting at least one of the first retrieval data and the second retrieval data, and means for retrieving at least one of the image data and the code data from the first storing means, the retrieving means having first means for retrieving the retrieval data input by the inputting means from the second storing means and second means for retrieving at least one of the image data and the code data corresponding to the retrieval data retrieved by the first means from the first storing means.

BRIEF DESCRIPTION OF THE DRAWINGS

FIG. 1 shows a block diagram of an information processing apparatus according to an embodiment of the present invention;

FIG. 3 shows a functional block diagram for explaining the structure of a control program or software used in the above embodiment;

FIG. 4 shows a functional block diagram showing a configuration of a FDR/W processing module of FIG. 3;

FIG. 7 shows a format of an image header;

FIG. 8 shows a format of a volume data header;

FIG. 9 shows a format of a file data header;

FIG. 10 shows a memory map of a main memory including module management data area, header management data area, and data header part area;

FIG. 11 shows a flow chart explaining an overall flow in the data registration processing;

FIG. 12 shows a flow chart explaining an overall flow in the data retrieval processing;

FIGS. 13 to 15 show displays used for FD read-in processing;

FIGS. 16 to 20 show flow charts explaining a flow in FD read-in processing;

FIGS. 21 to 24 show flow charts explaining a flow in FD write-in processing;

FIG. 25 and 26 show displays used for FD write-in processing;

FIG. 27 shows a flow chart for explaining a flow in the registration of specific application files;

FIGS. 28 to 30 show property sheets used in the specific file select processing;

FIGS. 31 to 33 show schematic diagrams for explaining comparative verification functions for code data check;

FIG. 34 shows a flow chart for explaining a control flow in the retrieval processing for the specific application files;.

FIG. 35 shows a display containing error message;

FIG. 36 shows a display used for the specific application file output processing;

FIG. 37 shows a display for foreign characters registration;

FIG. 38 shows a flow chart explaining the page change processing; and

FIG. 39 shows a flow chart explaining test page change.

DETAILED DESCRIPTION OF THE PREFERRED EMBODIMENTS

Figure 2:
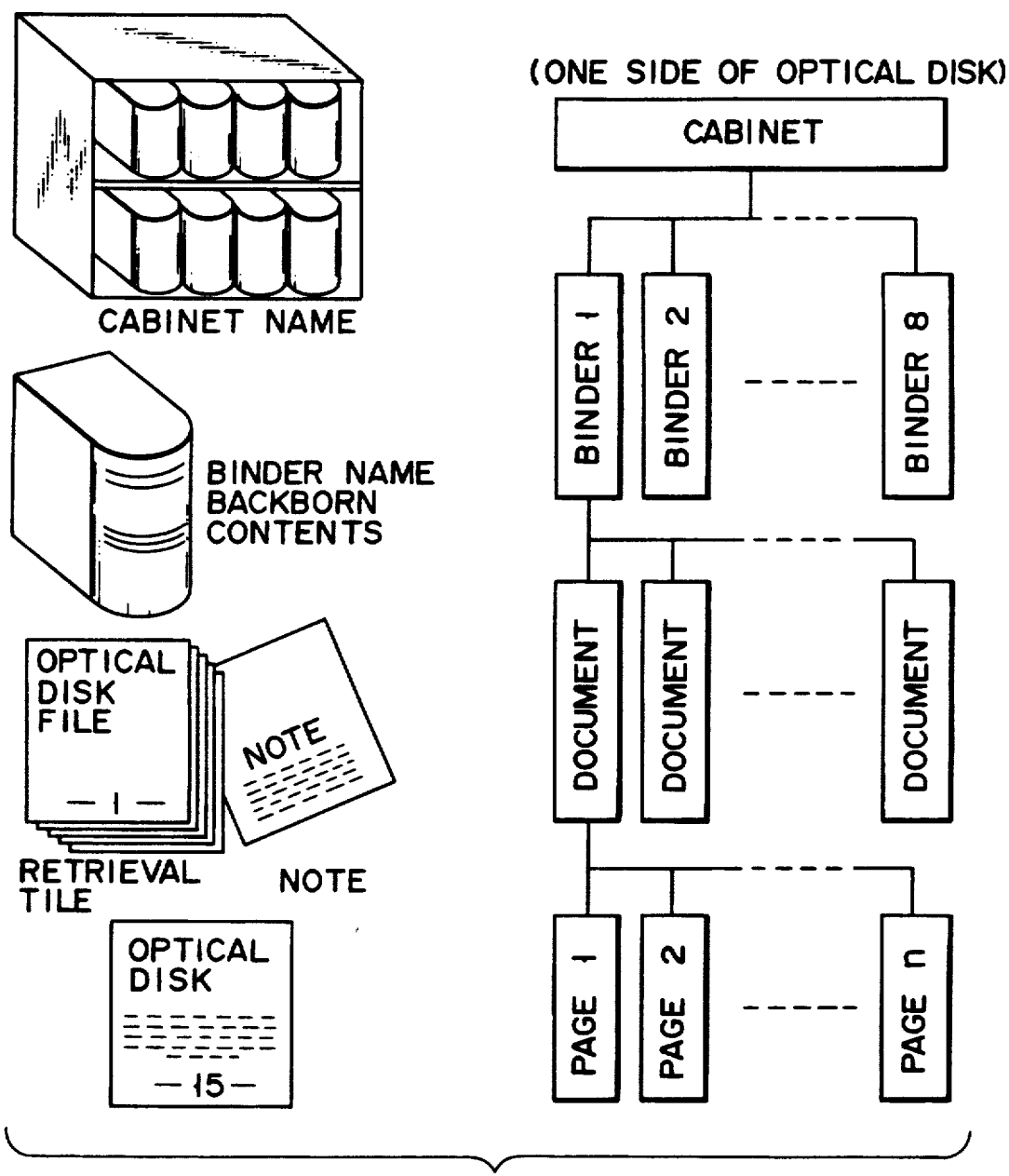
FIG. 2 shows a schematic view of a document management system employed in the above embodiment.

A hardware configuration of an information processing apparatus according to an embodiment of this invention will be described with reference to FIG. 1. As is shown, the processing apparatus is comprised of control module 11, memory module 10, image processing module 30, communication control module 31, scanner 20, optical disk 22, keyboard 23, CRT display device 24, printer 25, magnetic disk device 27, another magnetic disk device 28, mouse 29, system bus 41, and image bus 42.

The control module 11 is made up of CPU (central processing unit) 12 for controlling the filing apparatus, and interface circuit 17 allowing bidirectional communication between this CPU 12 and external devices, such as optical disk device 22, and magnetic disk devices 27 and 28. CPU 12 is coupled with keyboard 23 and mouse 29.

The memory module 10 is made up of main memory 13, page memory 14, display memory 15, and display controller 16. The display memory 15 and display controller 16 serve as a display interface. The page memory 14 has a memory capacity capable of storing image data amounting to several pages of A4-size documents. Page memory 14 is partially occupied by buffer memory area 14a. Data read/write for buffer memory area 14a is controlled by a counter (not shown).

The image processing module 30 is made up of magnification/reduction circuit 34, vertical/horizontal converter 35, compressor/expander (CODEC) 36, scanner interface 37 for scanner 20, printer interface 38 for printer 25, and internal bus 39. Magnification/reduction circuit 34, magnifies and reduces the size of a picture based on image data. Vertical/horizontal converter 35 rotates the picture by image data through the coordinate transformation. CODEC 36 compresses image data for redundancy reduction, and expands the compressed data to restore the compressed signal to the original signal. Internal bus 39 interconnects a group of magnification/reduction circuit 34 and vertical/horizontal converter 35 with another group of CODEC 36, scanner interface 37, and printer interface 38.

Communication control module 31 is made up of UCP (universal communication processor) 43 and BCP (bus communication processor) 44. UCP 43 is connected to external devices such as an FCP (facsimile communication processor) and personal computers, by way of an interface means such as RS-232C, GPIB and SCSI. BCP 44 is coupled with a LAN (local area network).

CPU 12 is provided with vector/raster converter 12a and code/image converter 12b. Vector/raster converter 12a converts vector data as drawing data as derived from floppy disk 28a into raster data as image data. Code/image converter 12b converts code data as document data as read out of floppy disk 28a into image data. The vector-to-raster and code-to-image data conversions may be executed by software, if necessary.

System bus 41 is a path for control signals and interconnects control module 11, memory module 10, image processing module 30, and communication control module 31. Image bus 42 is a path for image data and interconnects memory module 10 and image processing module 30.

Display memory 15 stores the image data as actually displayed in the windows of CRT display 24, e.g., the image data as obtained after the image data of page memory 14 is subjected to various types of processings such as magnification, reduction, rotation, insertion, and inversion.

Scanner 20, which is for example, a two-dimensional scanner, two dimensionally scans a document by a laser beam, collects the image data on the document, and outputs them in terms of electrical signal.

Magnetic disk device 28 is a floppy disk device using a 5.25 floppy disk 28a. The disk device reads the text files (document data) prepared by word processors. (not shown) from floppy disk 28a, and the code data files such as CAD drawing files and work sheet files (drawing data) as prepared by personal computers. Floppy disk 28a may use one of the many available OSs (operating systems) formats.

Optical disk device 22 sequentially stores onto optical disk 19 the image data as read out by scanner 20 and the code data as read out by magnetic disk device 28.

Keyboard 23 enters the retrieval codes respectively assigned to the code data and the image data to be stored into optical disk 19, and various commands for operations.

CRT display 24 is one of the output devices and uses a cathode ray tube as a visual presenting means. The CRT display 24 displays the image data from scanner 20, the code data read out by magnetic disk device 28, and the code data and image data as read out by optical disk device 22. Furthermore, the display device is capable of displaying more than one document by means of a maximum of four display windows. For example, four documents can concurrently be displayed, while being arrayed vertically. Various editing operations, such as magnification, reduction, rotation, and scroll, may be conducted in each window independently of other windows.

Printer 25 prints out data in hard copy form, such the image data from scanner 20, the code data read out by magnetic disk device 28, and the code data and image data as read out by optical disk device 22, and the image data being displayed by display device 24.

Magnetic disk device 27 is a hard disk device with magnetic disk 27a. Magnetic disk 27a stores various types of control programs, retrieval codes entered from keyboard 23, and retrieval data (management data) corresponding to each retrieval code. The retrieval data includes memory addresses and data size of the code data and/or the image data representing one document, which are stored in optical disk 19 with the retrieval codes assigned, and a flag to indicate the type of data, code data and image data. The one document code data and/or image data are stored into a retrieval data area of optical disk 19. Logical addresses are used. Therefore, when accessed, the physical track address and physical sector address in the optical disk is calculated for each address.

Mouse 29 is a pointing device. The device is used to selectively point to a desired item on the screen by moving a cursor vertically and/or horizontally on the screen. The items are displayed in a fixed location on the display screen, and include various modes, edited image, range of cutting and merging of images, icons, and the like.

How the image data and the code data are synthetically managed will be described with reference to FIG. 2, from viewpoint of the document management.

A document management system, as illustrated in FIG. 2, includes data hierarchy having four strata: cabinet, binder, document, and page. A cabinet corresponds to one side of optical disk 19. The cabinet may be defined by a maximum of eight binders. Each binder may contain a maximum of 30,000 documents. A title is assigned to each document. The structure of the titles is defined for each binder. One document is treated as a fundamental unit of a file. A ¢note", i.e., an explanation for document, may be added to the document, in addition to the title. Each document includes a maximum of 4095 pages.

The above document management system is structured correspond to a paper filing system. The page corresponds to the paper file. The document management system is designed to manage the code data, at the level of the page. Specifically, the page corresponds to the image data of one sheet of paper, the data of one sheet of floppy disk (volume data), the data of one file, or the data by merging the above three types of data. The document management system can manage code data and image data, which must be separately managed by the conventional filing apparatus. For example, within one document, a source file group (code data) of a given program is assigned to a first page, a program specification (code data) prepared by a word processor, to a second page, the results of processing (image data) to a third page.

A control program stored in main memory 13, i.e., the structure of software used in the filing apparatus will be described with reference to FIG. 3.

The software is made up of six modules, image input /output processing module 13b, floppy disk read/write (FDR/W) processing module 13c, optical disk read/-write (ODR/W) processing module 13d, display control module 13e, magnetic disk (MD) processing module 13f, and filing processing module 13a, which controls all the above modules 13b–13e.

A control flow of filing processing module 13a in a registration mode will next be described.

First, an operator determines whether the data to be registered is image data or data from a floppy disk, and enters the determination result to filing processing module 13a. After entering the title, when the data to be registered is image data, image input/output processing module 13b is called, so that the image data is transferred from scanner 20 to the module 13b. Then, display control module 13e is called, and checks the image data on CRT display 24. Following this, ODR/W processing module 13d is called, and the input image data is compressed, and recorded into optical disk 19. After calling MD processing module 13f, the address in optical disk 19, together with the input title data, is registered onto magnetic disk 27a.

To register the data onto a floppy disk, FDR/W processing module 13c is called. The designation and processing of the registered data, i.e., volume data, general files, or specific application files, are executed within FDR/W processing module 13c. Therefore, filing processing module 13a may be indifferent to these operations.

Within FDR/W processing module 13c, necessary data is read out from floppy disk 28a in response to a command entered by an operator, and is set up in a predetermined format in page memory 14. Filing processing module 13a calls the top address of the data and data length, and ODR/W processing module 13d, and records the data set up in page memory 14, into optical disk 19. When the data read out from floppy disk 28a cannot be stored at one time into page memory 14, filing processing module 13a repeats to call FDR/W processing module 13c and ODR/W processing module 13d. Upon completion of the registration, filing processing module 13a calls MD processing module 13f, and records the address in optical disk 19, together with the input title data, into magnetic disk 28a, as in the mode of registering the image data.

A control flow of filing processing module 13a in a retrieval mode will next be described.

An operator enters a retrieval formula containing a retrieval key and a key word for retrieval. The retrieval processing is executed by MD processing module 13f. The result of the retrieval is displayed by CRT display 24. Upon designation of a document to be retrieval by the operator, filing processing module 13a outputs a retrieval request command to ODR/W processing module 13d. ODR/W processing module 13d determines the type of flag referring to a data header part (to be described later). When the flag indicates image data, the module 13a applies the compressing processing to the data, and loads it into page memory 14. When the retrieved data is code data, the data is loaded intact into page memory 14.

When the operator requests the display of the retrieved result, the module 13a determines whether display of the retrieved data is possible or not, referring to the flag. If display is possible, the filing processing module 13a calls display control module 13e. Under control of the called display control module 13e, CRT display 24 displays the data. If display is impossible, an error message is output.

The called display control module 13e executes the processing for the retrieved data, image data, or the code data, and causes CRT display 24 to display the data on the display screen. When an operator requests the storage of the retrieved data into floppy disk 28a, FDR/W processing module 13c is called, and writes the retrieved data into the floppy disk. In this case, the entry of the file name in connection with the data writing is executed by FDR/W processing module 13c. Therefore, filing processing module 13a may be indifferent to the file name entry.

FDR/W processing module 13c is configured as is shown in FIG. 4. This module 13c is made up of interface 50 for interface with other modules, mode selector 51 for selecting either of the general file or the specific application file, general file processor 52, specific application file processor 53, and FDR/W executing unit 54.

FDR/W processing module 13c is called from filing processing module 13a. FDR/W processing module 13c reads out the code data from floppy disk 28a and writes it into page memory 14, and reads out the code data from paper memory 14, and writes it into floppy disk 28a. For the former operation, FDR/W processing module 13c is called by filing processing module 13a in a registration mode. For the later operation, it is called by the same in a retrieval mode. The above processings include the operations to attach the data header part to the data, and to interpret the same.

The formats of the code data and image data to be stored in optical disk 19 will be described with reference to FIGS. 5 through 9.

In this instance, the format of optical disk 19 will be described in connection with 5.25 inch floppy disk 28a and a specific OS file. If necessary, however, it is adaptable for other types of floppy disks of 8 inches and 3.5 inches, a magnetic disk or a magnetic tape, and other OS files.

Figures 5, 6:
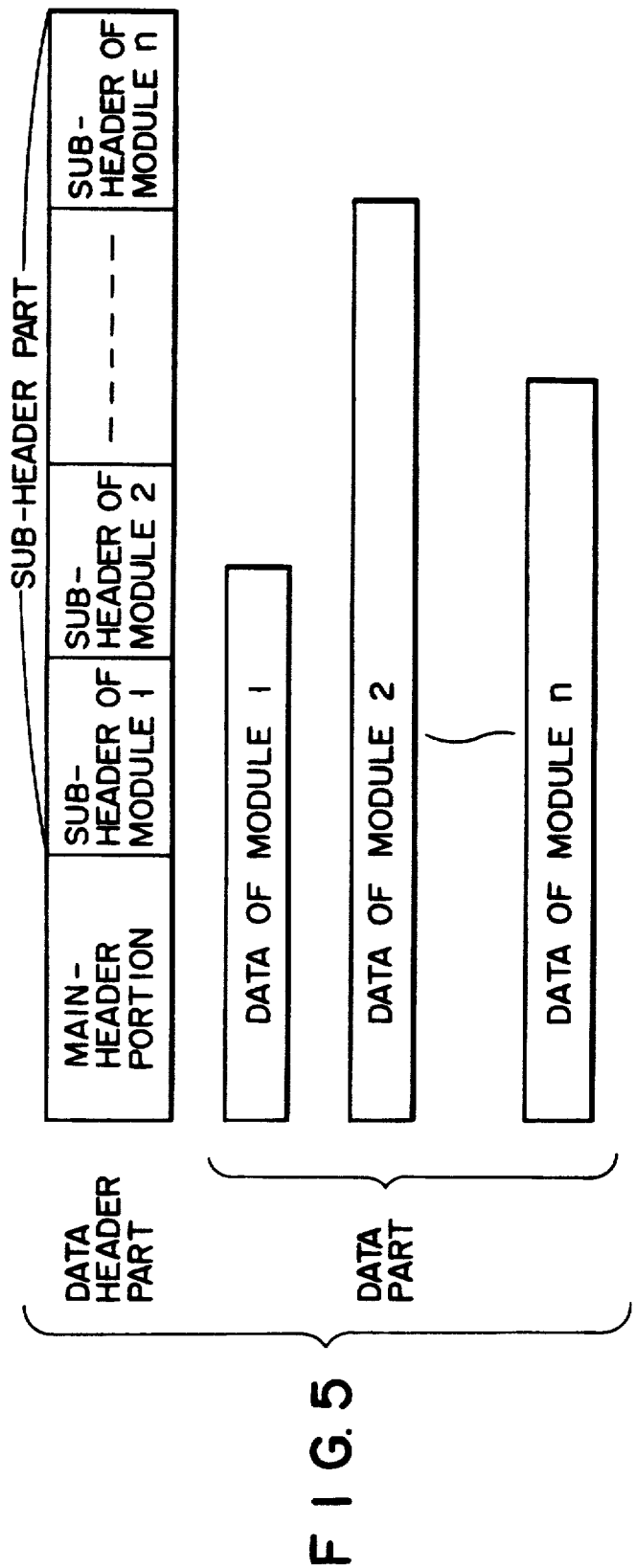
FIG. 5 shows a format of the data employed by the above software.
FIG. 6 shows a format of a main header.

As is shown in FIG. 5, the data of one page for optical disk 19 includes a data header part and a data part. The data part stores the data of modules 1 to n. If the data of one page contains a work sheet data file, a drawing data file (net file), and an image expanded picture (plotter file), the number of modules of data is "3". The data header part is made up of a main header portion and a sub-header part representing a format of data. The main header portion, as is shown in FIG. 6, further includes total data length (4 bytes), total header length (2 bytes), registration date (4 bytes), number of constituent modules (2 bytes), specific application flag (2 bytes), and preparatory area (2 bytes), and has a total length of 16 bytes. The specific application has one of two varieties: a document management application and a drawing data management application. The document management application is for filing document data prepared by a word processor. The drawing data management application is for filing drawing data (CAD) prepared a personal computer. The application flag (management data) of the main header portion is used for indicating either the document management application or the drawing data management application.

Both drawing data and document data are code data. As for drawing data, a plurality of files are generated for each drawing. In this instance, these files are a work sheet file, a net file, and a plotter file. The work sheet file is generated by an operator when he prepares the CAD. The net file describes relative positions and connections of parts in the drawing. The plotter file (vector file) describes the above matters of parts in a format used to operate printers and plotters. Under the drawing management application, these related files are systematically combined into one page, and are stored onto the optical disk for their management. The drawing data thus managed may provide effective and smooth filing and retrieval operations. Thus, the design drawings, together with the information of the used parts, are filed and managed. In later use, users may retrieve the drawings and their related information of parts simultaneously.

As for the document data, a plurality of files, such as a document file and a foreign character file in which foreign characters are registered, exist for each document. Under the document management application, these related files are systematically combined into one page, and are stored onto the optical disk for their management. The document data thus managed may provide effective and smooth filing and retrieval operations.

The sub-header part, as is shown in FIG. 5, is made up of several sub-headers whose number is determined by the number of constituent modules in the main header portion. The sub-header has one of three varieties: image data header, volume data header, and file data header. The image data header, as is shown in FIG. 7, includes sub-header length (2 bytes), kind flag (2 bytes), data address (4 bytes), data size (4 bytes), compression form (2 bytes: MH; MR; etc.), scanning density (2 bytes: 200 dpi; 300 dpi; etc.), image size (4 bytes: A4; B4; A3; etc.), and option area (0 to n bytes). The volume data header, as is shown in FIG. 8, includes sub-header length (2 bytes), kind flag (2 bytes), data address (4 bytes), data size (4 bytes), device flag (2 bytes), density flag (2 bytes), OS flag (2 bytes), volume name (12 bytes), and option area (0 to n bytes). The file data header, as is shown in FIG. 9, includes sub-header length (2 bytes), kind flag (2 bytes), data address (4 bytes), data size (4 bytes), device flag (2 bytes), density flag (2 bytes), OS flag (2 bytes), volume name (12 bytes), directory entry data (32 bytes), and option area (0 to n bytes).

The kind flag is used for indicating image data or code data. Code data includes volume data (data stored on the whole FD), or OS file data. The kind flag of FIG. 7 is a first identifying data identifying the image data. The kind flags of FIGS. 8 and 9 are second identifying data identifying the code data. The most significant bit of the kind flag indicates whether the data can be expanded into image data, that is, an image expandable flag. More specifically, this flag is set for image ,data and document data. The flag is not set the object code data such as an execution file of a software program. The data address indicates the address of the data in the optical disk. The data size indicates the size of the stored data.

The device flag indicates the type of floppy disk 28a from which the current data is derived. In this instance, three types of floppy disks of 5.25, 3.5, and 8 inches are available. The density flag indicates a recording density of the used floppy disk, 2DD or 2HD. When a magnetic tape is used, this flag indicates a recording density of 1600 bpi or 6250 bpi. The OS flag indicates the type of OS used.

The option area of the volume data header may be used to record, for example, the directory table data in the volume data, i.e., all the data stored in a sheet of FD. The directly entry data area of the file data header stores, for example, a copy of the 32-byte data as stored in the current floppy disk 28a according to the OS used. The 32-byte includes file name, file size, date, etc. The format of the data differs depending on the OS used.

Main memory 13, as is shown in FIG. 10, generally includes three memory areas: module management data area $13_1$, header management data area $13_2$, and data header part area $13_3$. Module management data area $13_1$ stores module numbers, the classifications of files, file names, the addresses and sizes of the data stored in page memory 14, which are tabulated with those items correspondingly arranged for each module, as is shown in FIG. 10. Header management data area $13_2$ stores the number of modules currently selected, and the address and size of the data of the header part as stored in main memory 13 (exactly stored in data header part area $13_3$). Those items are arranged in a table, as is shown.

A registration processing of the information processing apparatus according to this invention will be described with reference to FIG. 11. In the document management system referred to in connection with FIG. 2, a plurality of pages are combined into a document. A title, or retrieval code, is attached to each document. According to the document management system, a title is first entered (step S1. An operator enters, by a related key, a command indicating the type of the data to be registered, code data from floppy disk 28a or image data as read in by scanner 20. If the entered command is for image data (step S2), a document is set on scanner 20 (step S3), and is scanned by scanner 20 (step S4). In step S4, the image information on the document is optically collected and the collected data is properly compressed, and finally stored into the optical disk.

If the entered command is for code data (step S2), floppy disk 28a is set in floppy disk device (FDD) 28. The operator then enters a command indicating the type of the data, i.e., volume registration, normal OS file registration, or specific application file registration, i.e., work sheet registration or CAD or drawing data registration. If the entered command represents the volume registration (step S5), it is determined if the directory list data is attached to the data header part (step S6). If the answer is YES, the directory list data is set in the option area in the sub-header (step S7). Then, the volume data is stored into optical disk 19 (step S8).

In the case of the normal OS file registration (step S9), a directory list in floppy disk 28a is displayed and a file to be registered is designated or selected (step S10). In this case, a plurality of files may be selected simultaneously. After the data header part is prepared, the designated files are sequentially stored into optical disk 19 (step S11).

To register the specific application file (step S9), the module name is designated (step S12), so that a set of files having a file name formed under a given rule is automatically searched. After the data header part is prepared, the file set is stored into optical disk 19 (step S13). When it is retrieved later, one may desire to display the retrieved data at a high speed. To meet the requirement, step S14 is provided to designate high speed display of the retrieved data. If high speed display is designated (step S14), the data is formatted into a data format for the high speed display (step S15). The formatted data is attached to the data to be registered. This process will be described later.

If it is necessary to check the recorded data in optical disk 19, an indication is entered to the filing apparatus. After the data recording to optical disk 19 is completed, the information processing apparatus automatically checks the recorded data, and if an error is found, records the correct data again.

When the next page must be recorded (step S16), the above sequence of steps is repeated, starting with step S2. To record the next document (step S17), the repeated sequence starts with step S1.

A retrieval processing will be described with reference to a flowchart shown in FIG. 12.

A retrieval formula is entered (step S21). A retrieval processing is performed by using the retrieval data stored in magnetic disk 27a (step S22). A list of the related documents is displayed (step S23). If a desired document is not found (step S24), the retrieval formula is entered again (step S21). If the desired document is found (step S24), the operator selects it from the document list and directs the filing apparatus to execute the retrieval.

Then, the information processing apparatus reads out the first page data of the selected document from optical disk 19 (step S25). In step S26, a determination is made whether the read out data is the image data or not, referring to the kind flag in the data header part (step S26). If the answer is YES, the data is expanded and then displayed by CRT display 24 (step S27). If the next page retrieval is needed (step S28), the sequence of the above steps is repeated from step S25.

If the decision result in step S26 is NO, control passes to step S29 to check the kind flag of the data header part. If the flag represents image expandable code data, the code/image converter 12b converts the code data into image data. CRT display 24 displays the image data (step S30). If the code data is not image expandable, a message to that effect is displayed by CRT display 24 (step S31).

Then, the data is output to floppy disk 28a. Before this outputting, a determination is made whether the code data is of the OS type (step S32). If the answer is NO, the data is output to the whole of the floppy disk (step S33). If YES, the file name is designated (step S34), and the data output is applied to that file in the floppy disk 28a (step S33).

An FD read-in processing in the above registration mode will next be described with reference to FIG. 13.

When a FD read-in processing is called from the registration processing, the information processing apparatus requests an operator to select one of a general file and a specific application file, while presenting a display for mode selection on the screen of display 24 as is shown in FIG. 13. The operator selects a desired mode from those displayed items by mouse 29 or keyboard 23 (FIG. 1). If the operator selects the general file, the display is changed to a display for a general file, as is shown in FIG. 14. The selected specific application file will be described later.

The FD read-in processing when the general file is selected, will be described with reference to flow charts of FIGS. 14 and 15, and displays of FIGS. 16 through 20.

Figure 15:
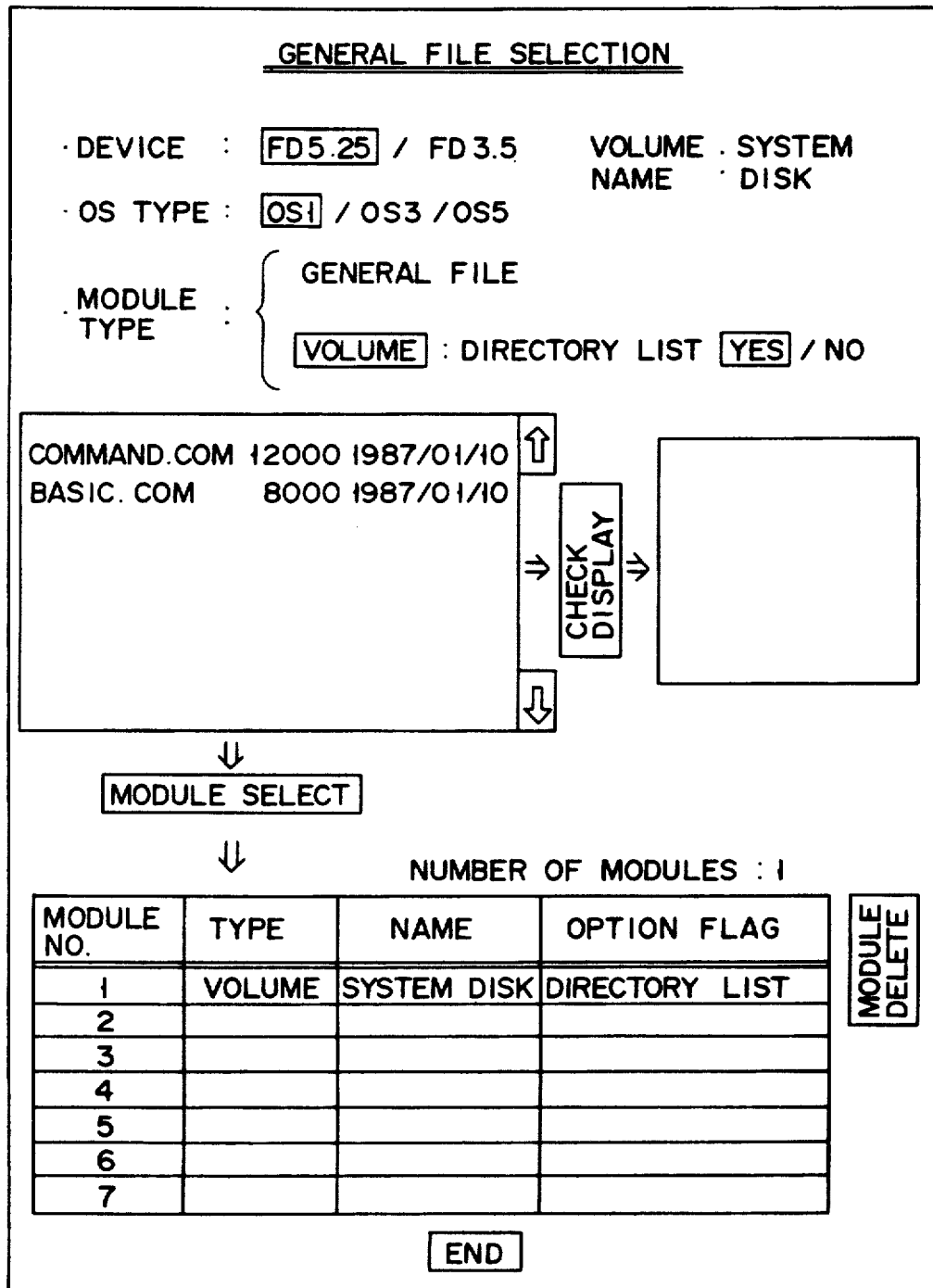

In FIG. 15, an operator sets floppy disk 28a loaded with data, in floppy disk device 28 (step S41). Then, the operator selects the type of a floppy disk to be used. To this end, either of FD5.25 and FD3.5 in item [Device] on the display screen of FIG. 14 is selected by means of keyboard 23 or mouse 29. Furthermore, the type of the OS used when the data was stored into the floppy disk is selected (step S42). Control accesses the floppy disk 28a, and reads out the volume name and the directory list data from the floppy disk (step S43), and stores them into main memory 13 while displaying them on CRT display 24 (step S44).

The operator selectively points out a series of directive items while seeing the display, by keyboard 23 or mouse 29 (step S45). Icon [Module Type] including "General file" and "Volume" is first pointed out. Either "General file" or "Volume" is selected. Following this, icons [Check Display], [Module Select], and [Module Delete], or [End] are selected in this order.

When icon [Check Display] is pointed out (step S46), a check display processing is executed (step S47). As the result of this processing, the dump data is converted into image data by code/image converter 12b, of FIG. 1 and is displayed. As is shown in a check display processing flow chart of FIG. 17, when the "General file" is selected as the type of module (step S61), an operator selects a file to be checked from the directory list (step S62). The entire data of the selected file are read out from floppy disk 28a (step S63), and are displayed by display device 24 (step S64). When "Volume" is selected (step S61), no check display processing is performed.

When icon [Module Select] is pointed out (step S48 of FIG. 16), the module select processing is executed (step S49). As is shown in a module select processing flow chart of FIG. 18, an operator selects one file from the displayed directory list (step S71). When the selected module type is the general file (step S72), the contents of the file bearing the file name selected are loaded into page memory 14 (step S73). The management data of that file is additionally stored into module management data area 13₁ of FIG. 10 (step S74), and the data header is additionally stored into data header part area 13₃ of main memory 13 (step S75). The file name is added to the module list on the display screen of display 24, so that the number of modules is increased by one (step S76).

In the display shown in FIG. 14, two modules are selected. Internally, the loaded file is managed by the module management data and header management data in main memory 13 (see FIG. 10). In this case, the kind flag of the sub-header in data header area 13₃ of FIG. 10 is set to indicate the general file. The data size, OS flag, device flag, and directory entry and the like are set.

Figures 19, 20:
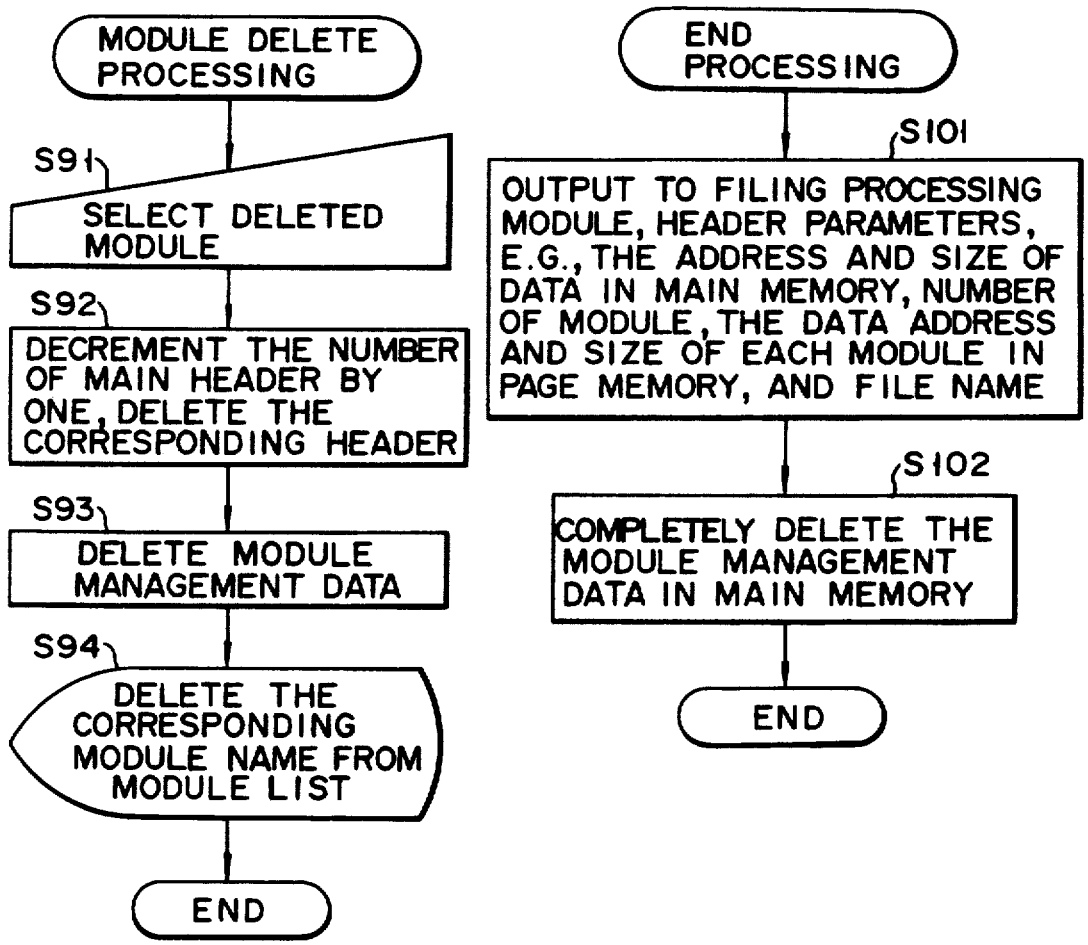

When icon [Module Delete] is pointed out (step S50 of FIG. 16), a module delete processing is performed (step S51). As a result, the module already selected is deleted. As is seen from FIG. 19 showing a module delete processing flow chart, an operator selects a file to be deleted from the directory list (step S91). The number of modules is decreased by one and the corresponding header is deleted (step S92). Furthermore, the corresponding module management data is deleted (step S93). Finally, the module name is removed from the module list being displayed on the screen (step S94).

When the operator points out icon [End] (step S52 of FIG. 16), an end processing is performed (step S53). As seen from FIG. 20 showing an end processing flow chart, the data address and size, and the number of modules in header management data area 13₂ of FIG. 10, the address and size of the data for page memory 14 as stored in module management data area 13₁, and additionally a key word to be stored in magnetic disk 27a, for example, file name, are transferred to filing processing module 13a (step S101). All the module management data in main memory 13 are erased (step S102), and the end processing is completed.

In the display of FIG. 15, "Volume" is selected for the "Module Type". The operation of this mode is similar to that when the general file is selected. The difference between the modes resides in a sequence of operation steps, which results from selection of "YES" for "Directory list" in step S81 of FIG. 18. The selection of "YES" sets the directory list data in the option area of the sub-header. The directory list data will be used in a retrieval mode.

In the module select processing flow chart shown in FIG. 18, if "Volume" is selected (step S72), the data of all the tracks of the designated device (floppy disk 28a) are loaded as module data into page memory 14 (step S78). The management data for that data is additionally stored into module management data area 13₁ in main memory 13. The data header is additionally stored into data header area 13₃ of main memory 13 (step S80). At this time, if the directory list flag is "YES" (step S81), the directory list data is set in the option area in the sub-header part as stored in main memory 13 (step S82). Furthermore, the selected module is additionally listed in the module list on the display (step S76).

As a matter of course, the general file and the volume module may coexist.

A FD write-in processing as called from the retrieval processing will be described next. Flow charts shown in FIGS. 21 to 24, with reference to displays shown in FIGS. 25 and 26.

In a retrieval mode, when data is read in from optical disk 19, if the data is code data, it is read in page memory 14. At this time, if the image expandable flag is set, the data can be displayed. When an operator directs the apparatus to write the code data into floppy disk 28a, filing processing module 13a requests FDR/W processing module 13c of FIG. 1 to write the data onto floppy disk 28a according to the direction by the data header portion.

The write-in processing to floppy disk 28a further calls the general file output or the specific application file output by the kind flag in the sub-header part. FIG. 25 shows a display for the kind flag indicating the "General file". The specific application file will be described later.

Upon calling of the general file output processing, the data header picks up the type of each module and the file name (step S111 in FIG. 21). In turn, CRT display 24 displays the display of FIG. 25 display including a module list (step S112). Incidentally, the display of FIG. 25 is obtained when an operator retrieves the data that is registered into optical disk 19 by using the display of FIG. 14.

The operator selectively points to directive items on the display by using keyboard 23 or mouse 29 (step S113). When icon [Module Select] is pointed to (step S114), the module select processing is performed (step S115). As is shown in FIG. 22 showing a module select processing flow chart, the operator selects one of the modules (step S131). More specifically, he sees the module list on the display of FIG. 25 display containing two types of modules, and selects a desired module by pointing to it using keyboard 23 or mouse 29. Upon selection of the module, the device, the type of OS, and the type of the module are read out from the sub-header in main memory 13 are read out (step S132), and are displayed (step S133). In the case of the general file (step S134), control terminates the module select processing, and returns to the general file output processing.

When icon [Check Display] is designated (step S116 of FIG. 21), the check display processing is performed. The result is that code/image converter 12b of FIG. 1 converts the dump data of the module data into image data, and transfers it to display 24 for display. As seen from the check display processing flow chart of FIG. 23, the sub-header of the selected module is read out from main memory 13 (step S141), and the address and size of the data in optical device 19 is read out from the subheader (step S142). Control reserves a memory area amounting to the data size in page memory 14, and transfers the data address and size to ODR/W processing module 13d. This module 13d loads the data into page memory 14 (step S143). The data is also displayed on the display (step S144).

When icon [FD Write-in Execution] is designated (step S118 of FIG. 21), FD Write-In execution processing is executed (step S119). The result is to write the data into floppy disk 28a of FIG. 1. If the file name change is decided, the file name of the file written into floppy disk 28a can be changed to the file name that was used in the data registration.

Figure 24:
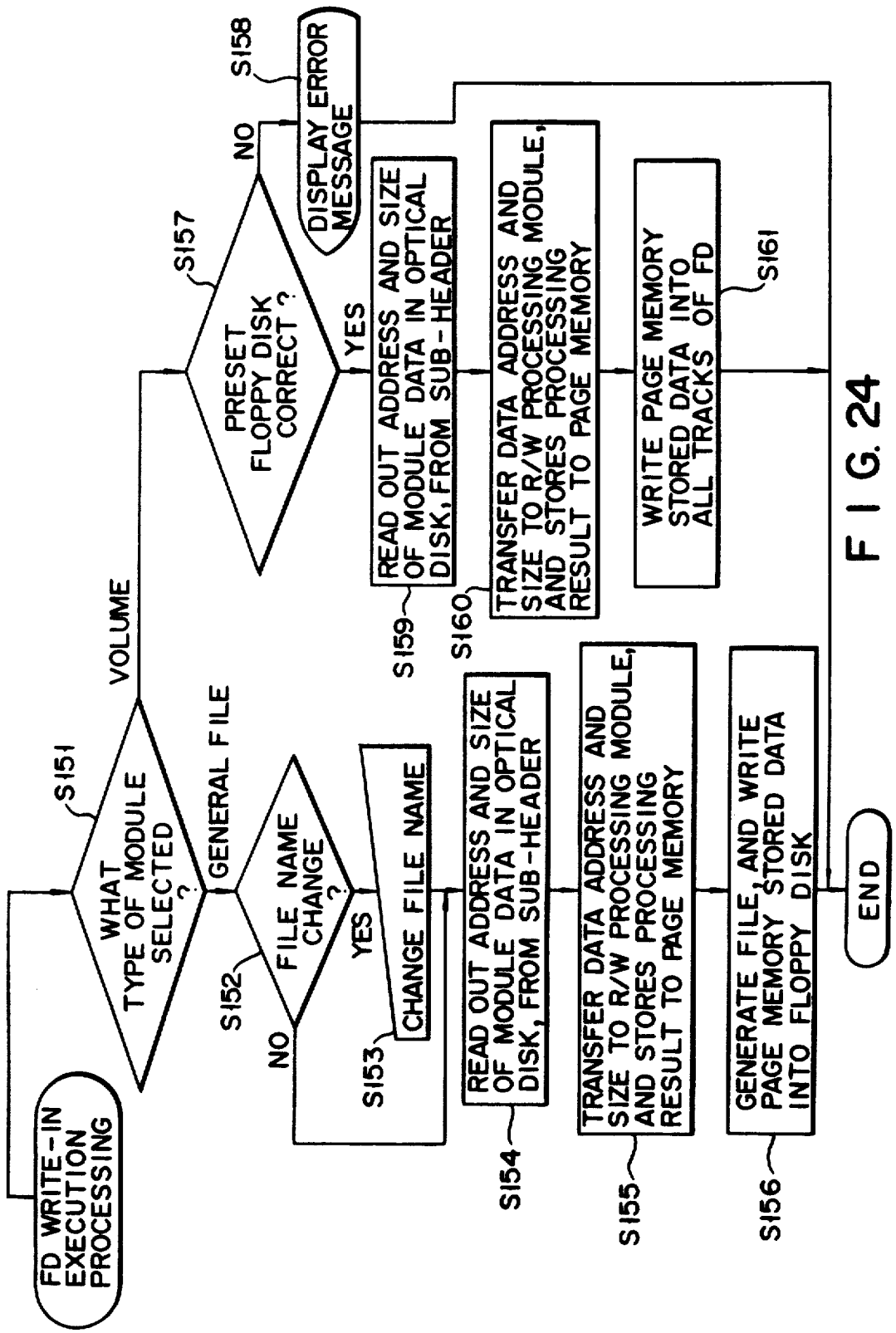

Reference is made to FIG. 24 showing the flow of the FD write-in execution processing. If a decision diamond of S151 gives the answer of the general file, another decision diamond S152 asks an operator to decide whether the file name is changed or not. If the answer is YES, the file name is changed to a new file name as entered (step S153). Control reads out the address and size of the data of optical disk 19, from the sub-header (step S154). Control reserves the memory area amounting to the data size in page memory 14, and transfers the data address and size to ODR/W processing module 13d of FIG. 3. This module 13d loads the data into page memory 14 (step S155). The data is also converted into the code data by code/image converter 12b, and loaded into floppy disk 28a (step S156).

When icon [File Name Change] is designated (step S120 of FIG. 21), the file name change processing is performed (step S121). When icon [End] is selected (step S122), the output processing of the general file ends.

FIG. 26 shows a display when "Volume" is selected for the type of module. The processing for this type of module is similar to that when "General file" is selected. In the difference between them, the "Directory list" flag is "YES" in step S135 of FIG. 22. In the case of "YES", when icon [Module Select] is selected, the directory list stored in the option area of the sub-header is presented on the display. This may be referred to when the data is output to floppy disk 28a. As seen from the module select processing flow chart of FIG. 22, when the device, type of OS, and type of the module are displayed (step S133), it is assumed that "Volume" is selected (step S134), and the directory list flag is "YES" (step S135). In this situation, the directory list data is read out from the option area of the sub-header (step S136), and is presented on the display (step S137).

In the FD write-in execution mode, if "Volume" is selected for the type module (step S151 of FIG. 24 showing the FD write-in execution processing flow chart), the device (floppy disk 28a) used in the registration is compared with the device currently used (step S157). When these are not coincident, an error message is displayed by CRT display 24 (step S158).

When coincidence occurs in step S157, the data of all the tracks of the device are loaded into the present device or disk. The address and size of the data in optical disk 19 is read out from the sub-header (step S159). In the next step S160, control reserves a memory area amounting to the data size in page memory 14, and transfers the data address and size to ODR/W processing module of FIG. 3. Module 13d loads the data into page memory 14. The data is converted into the code data by code/image converter 12b, and the converted code data is loaded into floppy disk 28a. In this way, the data in page memory 14 are written into all of the tracks of floppy disk 28a (step S161).

Alternatively, one file is selected from the directory list, and the selected file alone is written into floppy disk 28a.

A registration/retrieval processing of specific application file will be described. The registration of the CAD drawing data prepared by a personal computer will first be discussed with reference to FIG. 27. In the mode of registering the specific application, an operator sees a property sheet on the display, and selects a desired specific application file (step S171). Upon that selection, related or intended files are searched (step S172). If an intended file is not found (step S173), an error message such as "Exchange the floppy disk for another" is given on the display (step S174).

Figure 28:
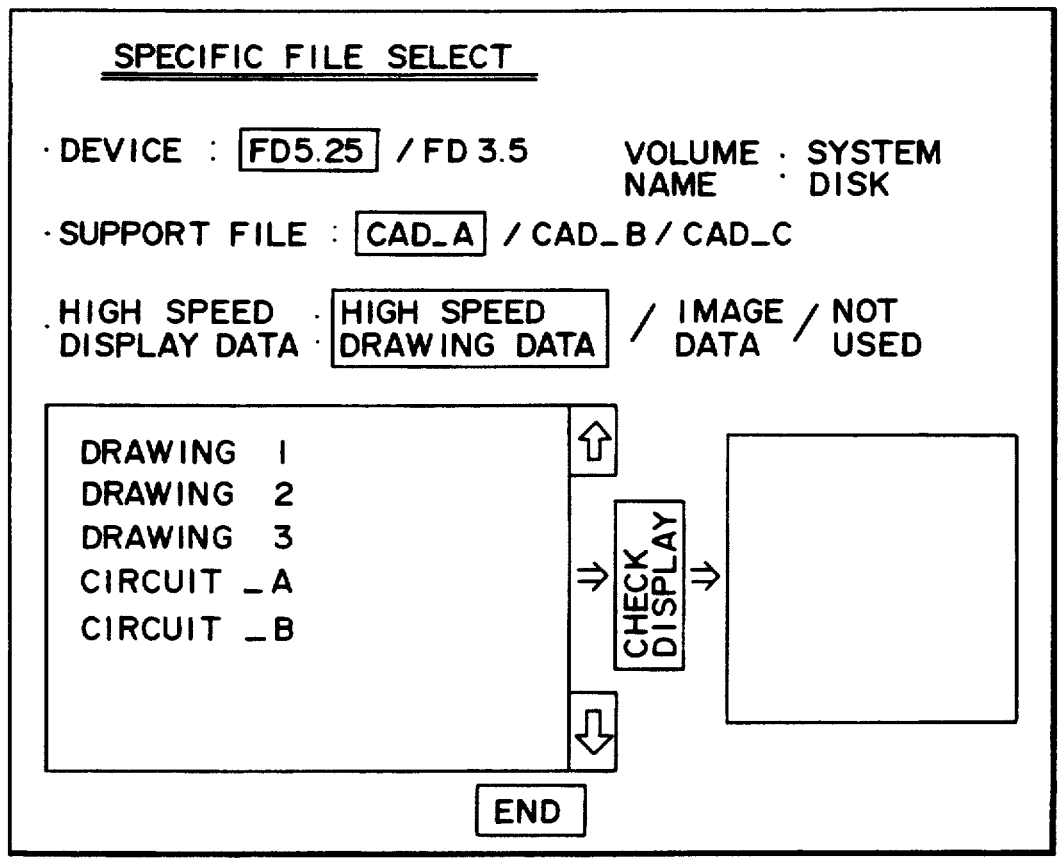

When control succeeds in searching the related files, i.e., the related files are found, if the additional use of a high speed display file is not needed (step S175) (this is designated by pointing to "not used" in item [High Speed Display Data] by mouse 29 or keyboard 23 of FIG. 28), the header for the related files is prepared (step S176). Next, those related files including that with the prepared header are merged (step S177). The data of the merged file is written into the optical disk (step S178). Control transfers the selected file name, proper data, identifying flags to filing processing module 13a (step S179), and terminates this processing.

In step S175, if the additional use of high speed display is needed, and "image data" is selected, the data is expanded into image data (step S180) (this is designated by pointing to "Image data" in [High Speed Display Data] of FIG. 28), and the image data is also merged (step S177). If "High speed drawing" is selected as in the designation of the above items, the high speed drawing data is generated (step S181), and the generated data is also merged with the files (step S177).

The registration of the specific application is be described below. When the registration of the specific application is directed, a specific application file processing module presents a property sheet on the display as is shown in FIG. 28. After seeing this property sheet, an operator selects a file name supported by this specific application file processing module by using, for example, mouse 29. Upon this selection, a list of file names with properties, such as "CAD", are displayed as is shown.

As mentioned above, a sheet of drawing contains a plurality of related files. Normally, the same file name attached with appropriate proper symbols such as ABC, and XYZ are applied for these files. The different file names will be found on the file display, with omission of the proper symbols. In some CAD systems, these files are listed in another directory or stored in another floppy disk 28a. Therefore, when the intended file cannot be searched as in step S174 in FIG. 27, an error message is presented as is shown in FIG. 29, and the operator is asked to change the present disk to another.

When icon [Check Display] is selected as in the case of the general file, the designated drawing is displayed, as shown in FIG. 30. At this time, this specific application file processing module searches an image expandable file with the designated file name, and expands it into the image.

As described with reference to step S176 of FIG. 27, the directory name, volume name, and type of media of each file, and the properties of each file such as file name, file size, and date of data preparation are picked up and assembled into the document management system.

For reliable and effective data retrieval, it is indispensable to determine whether the retrieval file to be loaded into floppy disk 28a is correct or not before it is loaded into the disk. Therefore, the information processing apparatus under discussion presents a drawing developed on the display and this improves the operability of the filing apparatus. For developing a CAD drawing on the display, the utility routine to execute the image expansion must be prepared for each CAD. Practically, therefore, it is almost impossible to expand all types of CAD drawings into an image. Identifying flags indicate the type of CAD used for the drawing data, and indicate if the image expansion of the drawing data is possible, at the current stage of registration. When reading out the file with such identifiers by an information processing apparatus, an operator may determine whether the file can be image expanded or not by the used filing apparatus.

It is desirable to perform the retrieval of drawing data at high speed. Even if the function to image expand the original data by CAD is supported by the information processing apparatus, the time consumed by expanding the data would considerably slow the operability of the processing apparatus. This problem becomes more serious as the size of the drawing increases. To solve this problem, some measure must be taken to display the CAD drawing data when it is retrieved.

To achieve this, in the information processing apparatus according to this invention, the plurality of CAD data are registered together with a file so formatted as to allow a high speed display of the CAD data. This is realized by the steps S181 and S180 of FIG. 27. Step S181 converts the CAD original file into the high speed drawing data so formatted as to allow the hardware/firmware for drawing processing be operable most efficiently, and to store the CAD files together with the generated data. The display speed achieved by this method depends on the performance of the hardware/firmware used. Step S180 transforms or expands the CAD original data into the image data, and uses the image data intact. As in step S175 described in connection with the property sheet of FIG. 28. Either of the two types of data, both of them, or none of them is selected and additionally used. When that the CAD drawing data is used for fixed purposes, this selection may automatically be made if the selecting procedure is programmed. The selection may be programmed by software. Furthermore, a combination of manual selection and software selection may be used, if necessary.

As described above, different types of files describing one sheet of drawing are systematically arranged and handled as a batch of data for storage and management. There are various methods to realize this document management. In the first method for the document management, various drawing data are arranged into documents, each with a title or a key word and a note. These properties are used to define an identifier to indicate the drawing data of the same drawing. In the second method, various data are arranged into pages. With the data of one drawing within one document, the data is stored at the memory location assigned to the page number. In the third method, related files are merged into unit data. The unit data is treated as one page. Further, the type of data is changed for each binder. A combination of the above methods also may be used. The above methods may be supported by the filing apparatus according to this invention. In such a case, any of the methods to be used may be selected manually. Further, the selection may automatically be made by a software technique. The above-described embodiment employs automatic selection.

In the first method, in which the data file of one drawing is made to correspond to one document, when the data registration is executed the work sheet file of that drawing is registered as a first page. Then the net data file and the plot file of the drawing are registered in the next page, and further the data file for high speed retrieval display is registered in response to the instruction by an operator, as described above. Some operation or operation specification requires that as for the order of data registration, the first page data is used as the image expandable data. Satisfactory outputting of the data to the floppy disk requires that the former order is employed. Any of the following ordering methods may be used: (1) the order is determined case by case, (2) the order is determined by an instruction from an operator, and (3) the system determines the order.

In any of the above registering orders, the registered data are each necessarily followed by the following property data: directory name, volume name, type of media, file name, file size, date of preparation, flag to indicate if the application software is used for data preparation, data to indicate if the registered data is expandable to an image, flag to indicate the type of CAD used, yes or no for use of the high speed display file. The data are registered page by page automatically or after check by an operator.

In the second method, in which the data files relating to one sheet of drawing are merged together into one page, when the data registration is executed the data registration is performed in a similar way, except that the data files are merged. Furthermore, this method uses additional properties concerning the merge, for example, the number of merged files and boundaries of the merged files.

The information processing apparatus according to this invention may register the data as prepared by every type of personal computer. When the data registered is retrieved, the compatibility of the apparatus with a floppy disk to be loaded with the retrieved data, must be checked. To this end, a flag to indicate the type of the OS of the personal computer by which the CAD data was prepared is further used for the property data.

The specific application processing of the embodiment as mentioned above is based on the latter method. Specifically, the work data file, net data file, plot data file, and further high speed drawing data are merged together. The merged data is stored into the data part of the optical disk format shown in FIG. 5. The image expandable files, data properties, identifying flags are stored into the sub-header part. When an operator points out icon [End] in the FIG. 30 property sheet, and checks the registered files, this processing is automatically performed by the specific application file processing.

The identifying flag to indicate the high speed display file is stored to the option area of the sub-header of FIG. 9. It is further stored as data to indicate the structure of the sub-header in the application flag or the reserve area of the main header of FIG. 6.

The CAD drawing data frequently describes a configuration of a figure by combining predetermined parts. These parts are screws, nuts, etc. for mechanical CAD, and general ICs, resistors, capacitors, etc. for electrical such a CAD. In such CAD, an entire drawing is generated by selecting their symbols and entering their relative positions. This type of CAD requires data indicating the symbols in addition to the data describing the relative positions and connections. For this reason, when registering the CAD drawing data, the symbols used are also registered. A general CAD uses two types of symbols, general symbols and symbols for special parts. The general symbols are used by every type of CAD. In registering the CAD drawing data, it is only needed to add the symbols for special parts alone. In the present embodiment, only the part symbols other than the general symbols as designed by users are additionally used when the data is registered.

When in data registration mode, appropriate code data is written into the optical disk as in the information processing apparatus under discussion, and for the code data to be written must be highly reliable. Therefore, it is desirable to check the code data before it is loaded into the optical disk. In this case, the most reliable check is to read out the stored data from the optical disk, and to compare it with the original data. The processing apparatus under discussion employs three check methods, which are selectively used depending on the apparatus composition used. These will be described with reference to FIGS. 31 to 33.

The following discussion assumes that the data to be registered is stored in page memory 14. The method to first be discussed is suitable for an apparatus whose page memory 14 has sufficient memory capacity. As is shown in FIG. 31, a memory area amounting to the data size of the registered data (original data) is reserved in page memory 14. After the data is loaded into optical disk 19, the data is read out from the the optical disk 19, and loaded into page memory 14. The read out data and the original data are compared in page memory 14 to determine whether they are coincident or not.

The second method uses an interface circuit with a comparative verifying function, as is shown in FIG. 32. With this function, instead of loading the data of optical disk into page memory 14, the original data to be written into the page memory is read out and subjected to the comparison.

The third method shown in FIG. 33, modifies page memory 14 so as to have a raster conversion processing function. In this method, the data as read out from optical disk 19 is loaded into page memory 14, while being exclusively ORed with the original data. The result of the exclusive OR operation is "0" when both data are coincident with each other, but is a logical value other than "0" when both data are not coincident. Therefore, a determination of whether the operation results are all "0" suffices for the registered data check. When both data are not coincident, the data must be registered again. In this case, since the original data are destroyed when it is read out, it must be restored into the correct data by reading out it from the optical disk and writing it into the page memory through Ex-OR logic. Alternatively, before being read out, the original data may be stored in floppy disk 28a or magnetic disk 27a.

As for these check methods, the information processing apparatus according to this invention is arranged so that a check mechanism is performed. The function used for the check mechanism is designated in advance by an operator on the basis of the apparatus composition.

The property data of the data, when registered, is preferably stored onto magnetic disk 27a for managing one document. The application software is designed so that, after the data registration processing ends, the above data is returned as return values to filing processing module 13a of FIG. 3, so as to allow the property data to be input to MD processing module 13f. This processing is similar to that for the general file processing.

Retrieval of the drawing data will be described with reference to FIG. 34. Control causes filing processing module 13a of FIG. 3 to retrieve the document by the ordinary procedure. At this time, the retrieved document is checked to determine if it is normal image data. If it is not normal image data, a decision is made as to whether or not the document is the specific application file, referring to the identifying flag described in the data. If it is not the specific application file, the general file processing is performed.

When the decision is made that the present document is the specific application file, control determines whether software for executing the processing of the data is installed in the processing apparatus (step S191). If such software is not installed (step S192), control presents a warning message on the display, as is shown in FIG. 35, and asks the operator to forcibly load the application file intact into a specific file according to the format of the apparatus or to not write the same (step S193).

When the software is installed, control expands the file according to the data structure as set at the time of its registration (step S194). In other words, the vector data supplied from floppy disk 28a is transformed into raster data (image data) by vector/raster converter 12a of FIG. 1.

During the check of the retrieved data, which is performed in normal retrieval mode, control picks up the option area of the sub-header, and checks the contents of the identifying flag to indicate if the high speed display data is present or absent (step S195). If high speed display data is present, control executes the image display (step S196) or the high speed image expansion (step S197). If high speed display data is not present, control executes the normal image expansion (step S198).

After an operator checks the data (step S199), the specific application file processing presents a property sheet as is shown in FIG. 36, on the display, and requires the operator to select the device used. The property sheet shows the types of support apparatus by which the specific application file was generated, such as CAD-A, CAD-B, and CAD-C, and shows the expanded files. The application software automatically executes the following tasks; 1) set the data respectively into files, 2) register the data in designated directory, and record data into different floppy disks 28a (step S200).

When the data is recorded into floppy disks 28a, an operator will frequently encounter floppy disks with different OS formats from that of the retrieved data. This difference can be determined by the OS identifying flag. After it is determined, if the format is different (step S201), control presents an error message to that effect, and requires an operator to make actions, for example, disk exchange and delete (step S202).

The remaining processings are substantially the same as those for the general file processing module.

The following describes the specific application file and the registration and retrieval of the document data (text file) by the word processor. The registration/retrieval processing of this type of document data, which is performed by code/image converter 12b of FIG. 1, is substantially the same as that of the CAD drawing data described above. When the document data contains special characters such as externally resistered characters, the data of special characters may be registered. To this end, the processing apparatus is capable of displaying a property sheet, as is shown in FIG. 37. In registering the word processor document data, i.e., text data, an operator may select either to register or not to register foreign letters while viewing the displayed property sheet. In the usual text data management, the data containing a plurality of pages or text pages is registered into a single file. The data file is printed out page by page, divisionally. In the data management system according to this invention, however, one page is assigned to one file, as described above. The difference between these data management systems are removed by the following two methods: 1) when next/preceding page is designated on the retrieval display, the data are successively processed file by file, and 2) when text next/preceding page is designated, the text data is successively updated page by page within the same file.

The processing flow of the registration/retrieval of text data will be described with reference to FIGS. 38 and 39. In FIG. 38, when the next page or the preceding page is designated (step S211), control reads out the address of the retrieved data (step S212). The data specified by the address is read out from optical disk 19 (step S213) and displayed on CRT display 24 (step S214).

In FIG. 39, when text next page of text preceding page is designated (step S221), control determines whether the data currently displayed is the text data or not (step S222). If the answer is YES, the processing is made so that the display position of the present data of page memory 14 is shifted forward or backward by one page (step S223). Then, that data is displayed (step S224).

As described above, an information processing apparatus according to this invention is capable of smoothly handling the document data and drawing data stored in the floppy disk, such as paper documents and drawings.

What is claimed is:

1. An information processing apparatus for processing both image data and code data, said apparatus comprising:

first storing means for storing the image data and the code data, the image data including preliminarily converted image data converted from a predetermined code data and the preliminarily converted image data being stored in association with the predetermined code data;

second storing means for storing identifying data specifying whether the code data and the predetermined code data stored in said first storing means are to be converted into image data;

means, coupled to the first and second storing means, for retrieving the code data, the preliminarily converted image data, and the identifying data from the first and second storing means;

means, connected to the retrieving means, for displaying the preliminarily converted image data retrieved by the retrieving means;

means, connected to the retrieving means, for determining whether the predetermined code data stored in association with the preliminarily converted image data and retrieved by the retrieving means is to be converted into image data by referring to the identifying data and the displayed preliminarily converted image data; and means, connected to the retrieving means and the determining means, for converting the retrieved code data into image data when the determining means determines that the code data is to be converted into image data.

2. An information processing apparatus according to claim 1, wherein the apparatus further comprises:

means for displaying a message stating that the retrieved code data cannot be displayed when said determining means determines that the retrieved code data cannot be converted into image data.

3. An information processing apparatus according to claim 1, wherein the apparatus further comprises:

third storing means for storing the preliminarily converted image data as high speed display data having smaller contents than those of the image data converted from the code data when the image data and the code data are retrieved.

4. An information processing apparatus according to claim 3, wherein the apparatus further comprises:

fourth means for storing high speed display code data;

means for expanding the high speed display code data stored in said fourth storing means into high-speed display image data; and fifth storing means for storing the expanded high speed display image data before the expanded high speed display image data are displayed by said displaying means.

5. An information processing apparatus according to claim 1, wherein said converting means includes a code-/image conversion circuit.

6. An information processing apparatus according to claim 1, wherein said displaying means further comprises means for displaying the image data corresponding to the code data converted by the converting means.

7. An information processing apparatus according to claim 1, wherein said identifying data includes an identification flag to be set when the code data is expandable into image data.

8. An information processing apparatus for processing both image data and code data, said apparatus comprising:

means for receiving code data to be registered in the information processing apparatus;

means, connected to the receiving means, for converting the received code data into corresponding high speed display image data;

first storing means for storing the received code data and the corresponding high speed display image data in an associated manner; and second storing means for storing first identifying data specifying whether the code data stored in the first storing means is to be converted into corresponding image data and for storing second identifying data specifying whether the high speed display image data is stored in the first storing means.

9. The information processing apparatus according to claim 7, further comprising means for supplying the code data to said second input means.

* * * * *